(12) United States Patent
Mickelson et al.

(10) Patent No.: US 9,751,136 B2
(45) Date of Patent: Sep. 5, 2017

(54) BACK SPOTFACING SYSTEM AND METHOD

(71) Applicant: The Boeing Company, Chicago, IL (US)

(72) Inventors: Derek L. Mickelson, Bothell, WA (US); Joel T. Adriance, Arlington, WA (US); Alan R. Merkley, Greenback, WA (US); Christopher J. Gray, Clinton, WA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 14/709,467

(22) Filed: May 11, 2015

(65) Prior Publication Data

US 2016/0332238 A1 Nov. 17, 2016

(51) Int. Cl.
*B23B 51/10* (2006.01)
*B23B 51/12* (2006.01)
(Continued)

(52) U.S. Cl.
CPC ............ *B23B 51/102* (2013.01); *B23Q 15/20* (2013.01); *B23B 2260/128* (2013.01);
(Continued)

(58) Field of Classification Search
CPC ............ B23B 51/102; B23B 29/03432; B23Q 15/007; B23Q 15/22; B23Q 17/2233;
(Continued)

(56) References Cited

U.S. PATENT DOCUMENTS 2,663,203 A * 12/1953 Fried ................. B23B 51/08
408/154
3,017,791 A * 1/1962 Fried ................. B23B 29/03453
408/180
(Continued)

FOREIGN PATENT DOCUMENTS

DE 1777063 A1 * 4/1971 ........... B23B 51/102
EP 0043920 A1 * 1/1982 ......... B23Q 17/2241
EP 1197819 A2 * 4/2002 ......... B23Q 17/2241

OTHER PUBLICATIONS

Erix Automatic Back Spotfacing Tools, May 11, 2015, from Internet website at web address <http://www.erixtool.com/erix1.html>, 2 pages.

*Primary Examiner* — Sunil K Singh
*Assistant Examiner* — Ryan Rufo

(57) ABSTRACT

A back spotfacing system having a machining apparatus with a through-hole cutter tool. The tool has an elongate member movable to coaxially extend through a hole in a workpiece from a first side of the workpiece, the workpiece coupled to the apparatus. The tool has a cutter element pivotal between a stowed position on the elongate member, a contact position with an inner surface of the hole, and an extended position extending radially from the elongate member. In the extended position, the cutter element extends to machine and back spotface a surface on a second side of the workpiece opposite the first side. The system has a power system for powering the apparatus and tool, and a measurement system coupled to the apparatus for measuring one or more hole exit positions of the cutter element and one or more surface contact positions of the cutter element on the surface.

14 Claims, 12 Drawing Sheets

(51) Int. Cl.
*B23Q 15/20* (2006.01)
*B23Q 17/22* (2006.01)
*B23Q 15/22* (2006.01)

(52) U.S. Cl.
CPC ....... *B23B 2270/32* (2013.01); *B23B 2270/48* (2013.01); *B23Q 15/22* (2013.01); *B23Q 17/2241* (2013.01)

(58) Field of Classification Search
CPC ........... B23Q 17/2241; Y10T 408/5621; Y10T 408/5622; Y10T 408/05; Y10T 408/13; Y10T 408/175
See application file for complete search history.

(56) References Cited

U.S. PATENT DOCUMENTS

| | | | | |
|---|---|---|---|---|
| 3,195,378 A | * | 7/1965 | Cogsdill | B23B 51/102 408/26 |
| 4,451,892 A | * | 5/1984 | McMurtry | G01B 7/008 318/572 |
| 5,035,554 A | * | 7/1991 | Nickols | B23Q 17/2216 33/626 |
| 5,256,010 A | * | 10/1993 | Hehl | B23B 51/102 408/11 |
| 5,848,860 A | * | 12/1998 | Steiner | B23B 51/102 408/159 |
| 5,927,911 A | * | 7/1999 | Steiner | B23B 51/102 408/159 |
| 5,954,462 A | | 9/1999 | Way et al. | |
| 6,270,296 B1 | * | 8/2001 | Steiner | B23B 51/102 408/159 |
| 9,089,905 B1 | * | 7/2015 | Craig | B23B 51/08 |
| 9,517,511 B1 | * | 12/2016 | Sisco | B23B 35/00 |
| 2009/0279970 A1 | * | 11/2009 | Gray | B23B 51/101 408/194 |

* cited by examiner

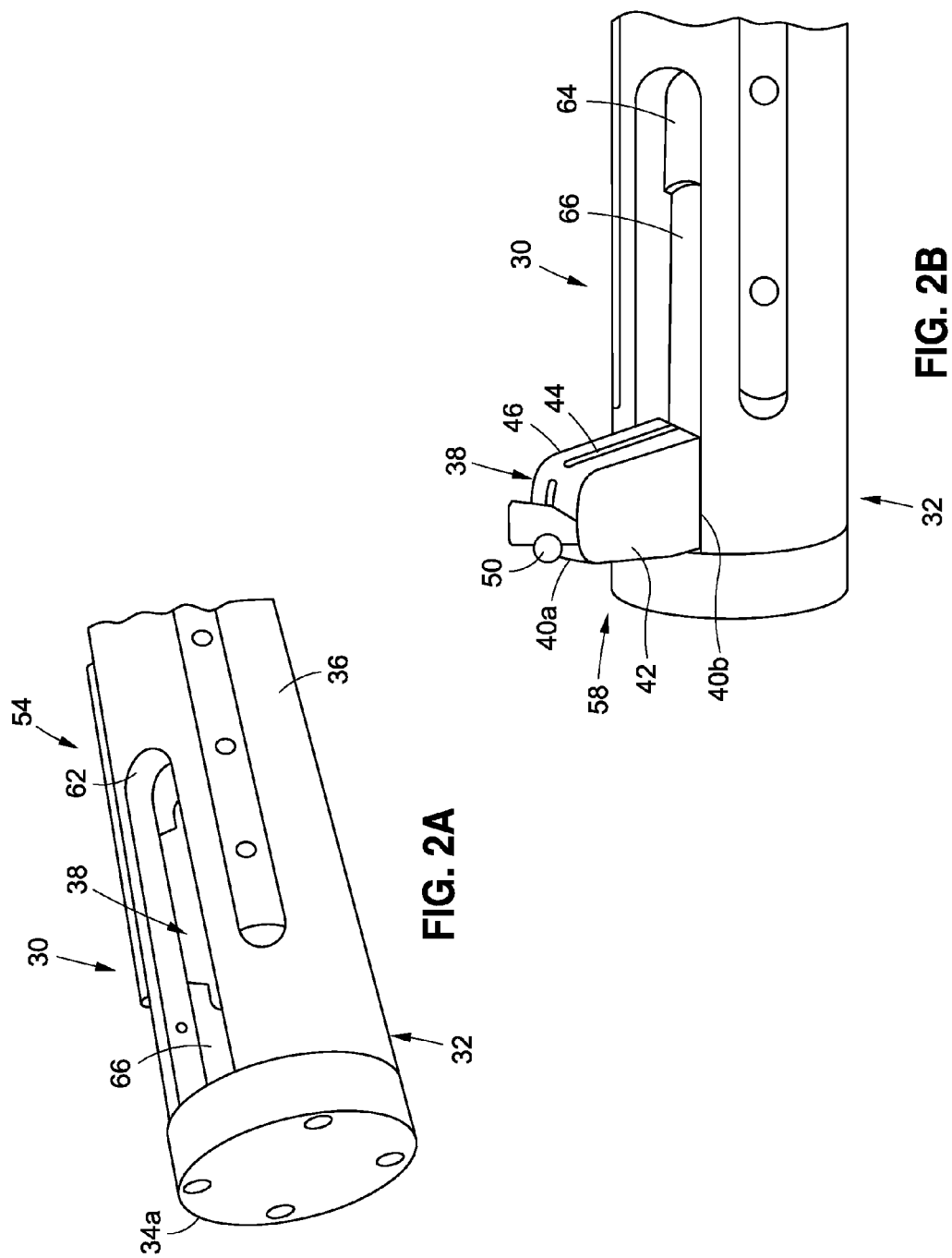

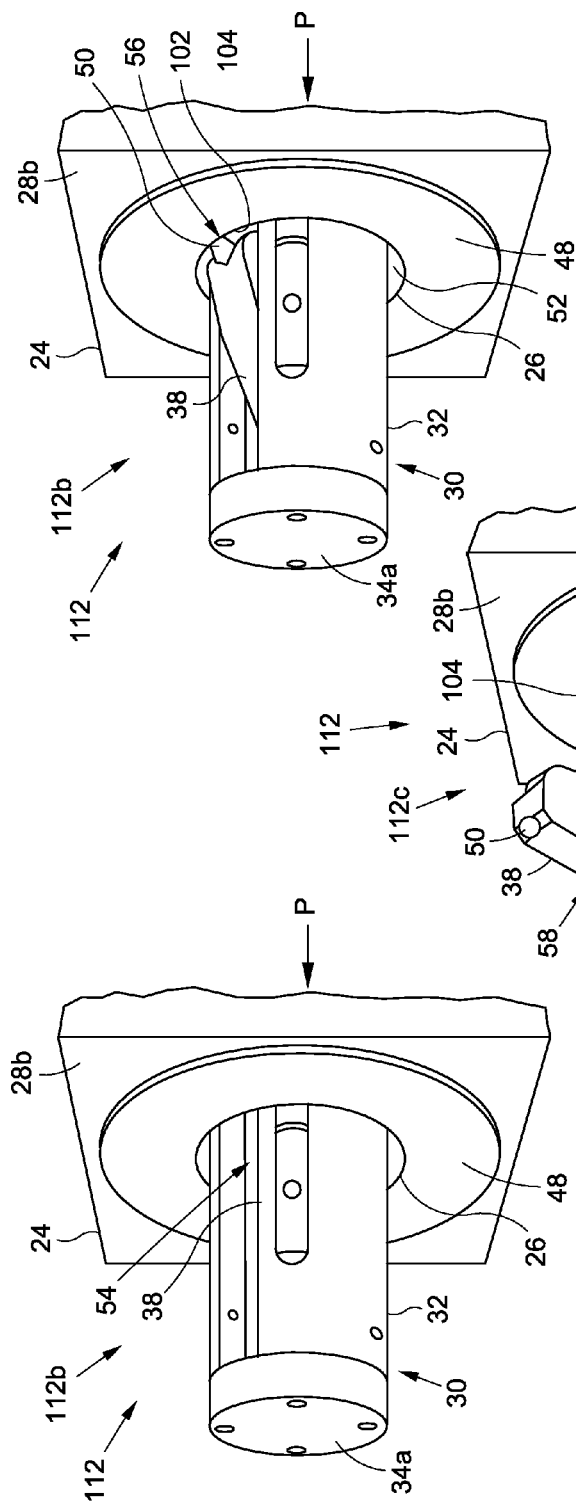
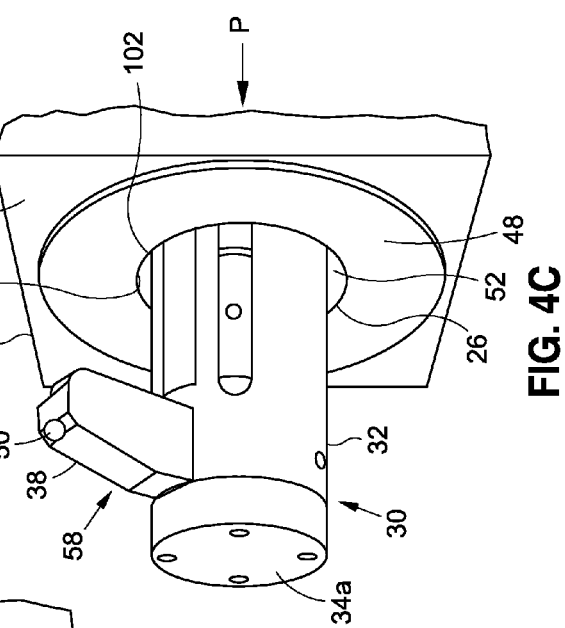
FIG. 4A
FIG. 4B
FIG. 4C

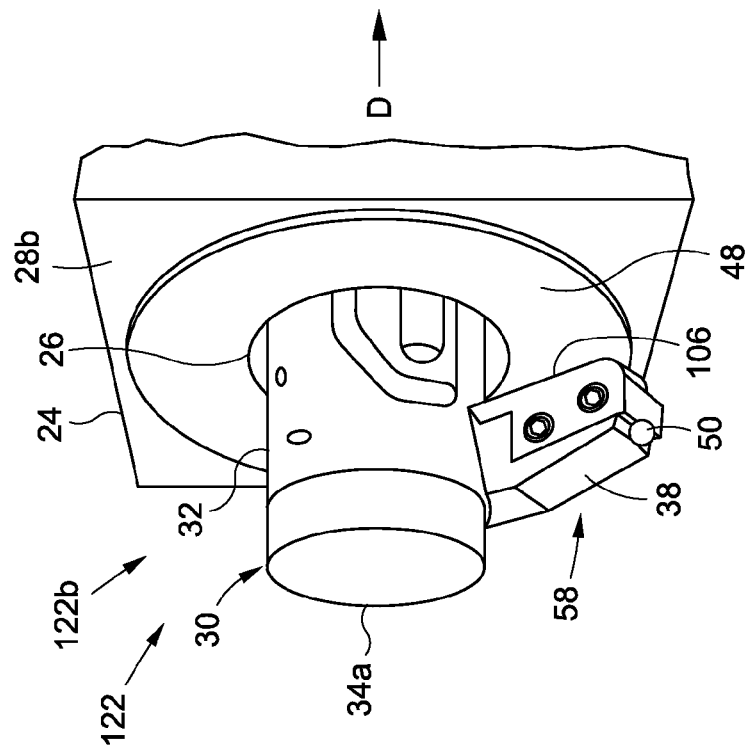
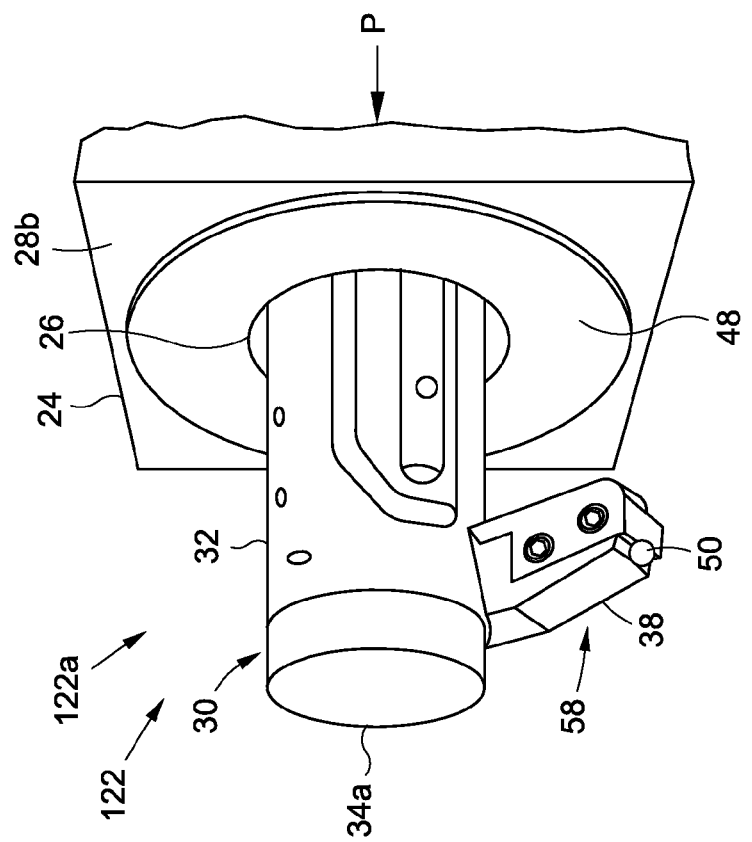
FIG. 5A
FIG. 5B

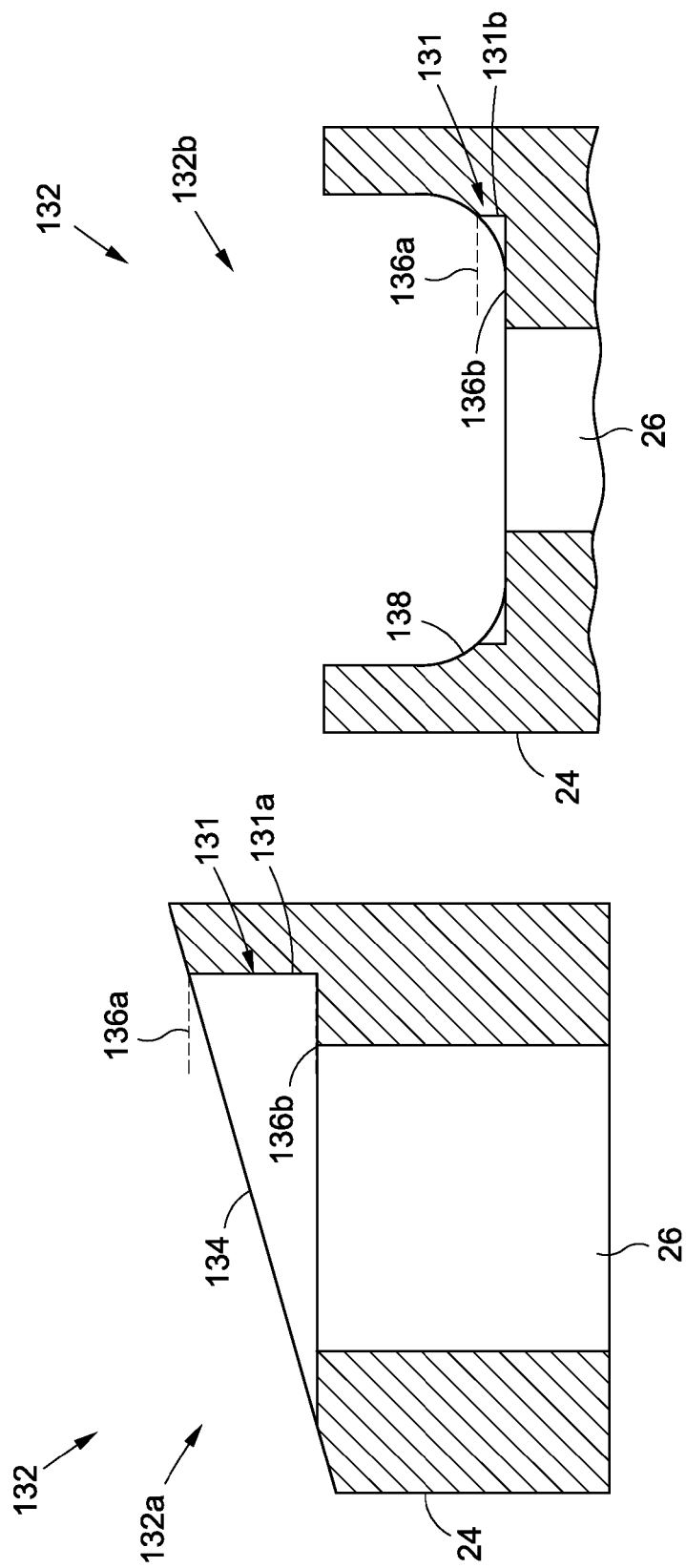

BACK SPOTFACING SYSTEM AND METHOD

BACKGROUND

1) Field of the Disclosure

The disclosure relates generally to systems and methods for machining structures, and more particularly, to improved systems and methods for back spotfacing of structures or parts, such as workpieces.

2) Description of Related Art

Spotfacing is a secondary mechanical process to machine, mill, or cut a surface, e.g., spotface, such as around an outside of a hole that has been previously drilled or formed in a structure, part, or workpiece, for example, a structure, part, or workpiece having an angled or curved surface to be spotfaced. Back spotfacing entails spotfacing a surface, e.g., back spotface, on the inside of the structure, or on the backside of the part or workpiece.

In spotfacing or back spotfacing, the hole may include, for example, a fastener hole, a bolt hole, a screw hole, or the like. The surface, e.g., spotface or back spotface, is perpendicular to the axis of the hole, and allows a head of the fastener, bolt, or screw, a nut, or another object to be seated on the surface, to be evenly tightened down on the surface.

Spotfacing and back spotfacing systems and methods may be used in a variety of applications. Such applications may include manufacturing of aircraft structures and parts, manufacturing of automobile parts, carpentry, woodworking, and other applications where a smooth and accurately located surface is desired.

Known systems and methods exist for back spotfacing the inside of structures. For example, one such known system and method for back spotfacing the inside of an aircraft structure requires the use of large tooling jigs to align large, heavy manual feed air motors to the previously drilled hole which used the same tooling. Such large equipment may be expensive to use and maintain and time consuming to set up, and may, in turn, result in increased manufacturing costs and increased time of manufacturing. In addition, such known system and method requires one or more additional workers to monitor the back spotfacing process from inside the structure. This may result in increased labor costs, and may, in turn, result in increased manufacturing costs. Moreover, having to monitor the back spotfacing process from inside the structure may involve the one or more additional workers being in a confined space near moving equipment, which may present ergonomic or safety issues.

In addition, due to fatigue and strength concerns, a cut depth of a spotface or back spotface made on an aircraft structure, part, or workpiece may require very tight tolerances and may need to meet certain cut depth requirements. For example, after obtaining a full circle cut in an aircraft part, it may only be possible to cut an additional 0.020 inch deeper to meet such cut depth requirements. Simply machining or cutting a deep spotface or back spotface may not be enough to meet such cut depth requirements. Further, although an additional worker may make a visual determination whether a minimum cut depth has been made to achieve a spotface or back spotface surface, such visual determination may not be precise. Thus, it is desirable to have a back spotfacing system and method that determines a precise cut depth prior to cutting.

Accordingly, there is a need in the art for an improved system and method for back spotfacing of structures, such as workpieces, that is simple to use, safe, cost effective, reliable, repeatable, and determines a precise cut depth, and that provides advantages over known systems and methods.

SUMMARY

Example implementations of this disclosure provide an improved system and method for back spotfacing of structures, such as workpieces. As discussed in the below detailed description, embodiments of the improved system and method for back spotfacing of structures, such as workpieces, may provide significant advantages over existing back spotfacing systems and methods.

In one embodiment there is provided a back spotfacing system. The back spotfacing system comprises a machining apparatus having a through-hole cutter tool attached to the machining apparatus.

The through-hole cutter tool comprises an elongate member being movable to coaxially extend through a hole in a workpiece from a first side of the workpiece, the workpiece being coupled to the machining apparatus. The through-hole cutter tool further comprises a cutter element pivotal between a stowed position on the elongate member, a contact position with an inner surface of the hole, and an extended position disengaged from the inner surface and extending radially from the elongate member. In the extended position, the cutter element extends to machine and back spotface a surface on a second side of the workpiece opposite the first side.

The back spotfacing system further comprises a power system coupled to the machining apparatus for powering the machining apparatus and the through-hole cutter tool. The back spotfacing system further comprises a measurement system coupled to the machining apparatus for measuring one or more hole exit positions of the cutter element and one or more surface contact positions of the cutter element on the surface of the second side of the workpiece.

In another embodiment there is provided an automated back spotfacing system. The automated back spotfacing system comprises a machining apparatus. The machining apparatus comprises a through-hole cutter tool attached to the machining apparatus.

The through-hole cutter tool comprises an elongate member being movable to coaxially extend through a hole in a workpiece from a first side of the workpiece, the workpiece being coupled to the machining apparatus. The through-hole cutter tool further comprises a cutter element pivotal between a stowed position on the elongate member, a contact position with an inner surface of the hole, and an extended position disengaged from the inner surface and extending radially from the elongate member. The cutter element is configured for obtaining internal probe measurements when the cutter element disengages from the inner surface and configured for obtaining external probe measurements when the cutter element is in the extended position, and configured to cut and back spotface a surface on a second side of the workpiece opposite the first side.

The machining apparatus further comprises a feed axis member coupled to the elongate member and configured to extend and retract the elongate member through the hole of the workpiece. The machining apparatus further comprises an elongated rotating member coupled to the elongate member and configured to rotate the elongate member. The machining apparatus further comprises an elongated drawbar actuated by a drawbar actuator and configured to actuate the cutter element to pivot from the stowed position to the extended position.

The machining apparatus further comprises a power system coupled to the machining apparatus for powering the machining apparatus and the through-hole cutter tool. The machining apparatus further comprises a measurement system coupled to the machining apparatus for measuring the internal probe measurements and measuring the external probe measurements. The machining apparatus further comprises a measurement analysis system for determining a hole exit profile based on the internal probe measurements, and a surface profile based on the external probe measurements. The measurement analysis system comprises a computer system having a system logic.

In another embodiment there is provided a back spotfacing method. The method comprises the step of providing a machining apparatus having a through-hole cutter tool attached to the machining apparatus, and further having a power system and a measurement system. The method further comprises the step of inserting the through-hole cutter tool into a hole on a first side of a workpiece facing the through-hole cutter tool. The method further comprises the step of pivoting a cutter element of the through-hole cutter tool from a stowed position on an elongate member of the through-hole cutter tool to a contact position with an inner surface of the hole.

The method further comprises the step of advancing the elongate member through the hole and measuring with the measurement system a hole exit position, when the cutter element disengages the inner surface and pivots to an extended position extending radially from the elongate member. The method further comprises the step of retracting the through hole cutter tool back into the hole so that the cutter element is in the stowed position, rotating the through hole cutter tool in the hole. The method further comprises the step of repeating the pivoting and advancing steps to measure additional hole exit positions to calculate a hole exit profile.

The method further comprises the step of moving the cutter element towards a surface on a second side of the workpiece opposite the first side by retracting the elongate member, until the cutter element contacts the surface. The method further comprises the step of measuring with the measurement system a surface contact position when the cutter element contacts the surface. The method further comprises the step of advancing the elongate member through the hole and moving the cutter element off the surface, rotating the elongate member in the hole. The method further comprises the step of repeating the moving and measuring steps to measure additional surface contact positions to calculate a surface profile. The method further comprises the step of using the cutter element in the extended position to back spotface the surface on the second side of the workpiece.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2A is an illustration of a perspective, close-up, cut-away view of an embodiment of a through-hole cutter tool that may be used in an embodiment of a back spotfacing system and method of the disclosure, showing a cutter element in a stowed position in an elongate member;

FIG. 2B is an illustration of a perspective, close-up, cut-away view of the through-hole cutter tool of FIG. 2A, showing the cutter element in an extended position extending from the elongate member;

FIGS. 4A-4C are illustrations of a perspective, close-up, cut-away view of an embodiment of a through-hole cutter tool that may be used in an embodiment of a back spotfacing system and method of the disclosure, showing the through-hole cutter tool at various steps of an internal probe operation performed on a workpiece;

FIGS. 5A-5B are illustrations of a perspective, close-up, cut-away view of an embodiment of a through-hole cutter tool that may be used in an embodiment of a back spotfacing system and method of the disclosure, showing the through-hole cutter tool at various steps of an external probe operation performed on a workpiece;

FIG. 6A is a cross-sectional side view of a back spotface cut into a planar surface using an exemplary embodiment of a back spotfacing system and method of the disclosure;

FIG. 6B is a cross-sectional side view of a back spotface cut into a curved surface formed using an exemplary embodiment of a back spotfacing system and method of the disclosure;

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1A:
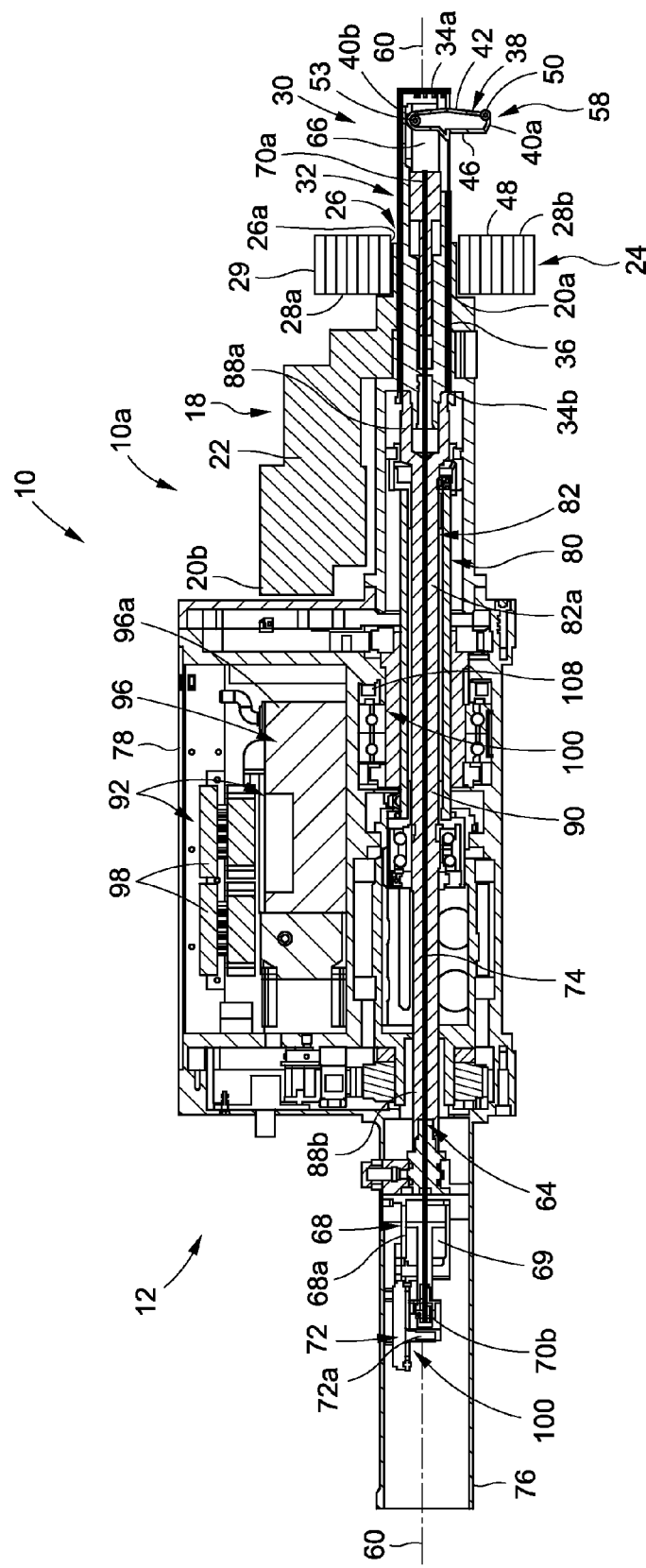
FIG. 1A is a cross-sectional side view of an embodiment of a back spotfacing system of the disclosure.
Figure 1B:
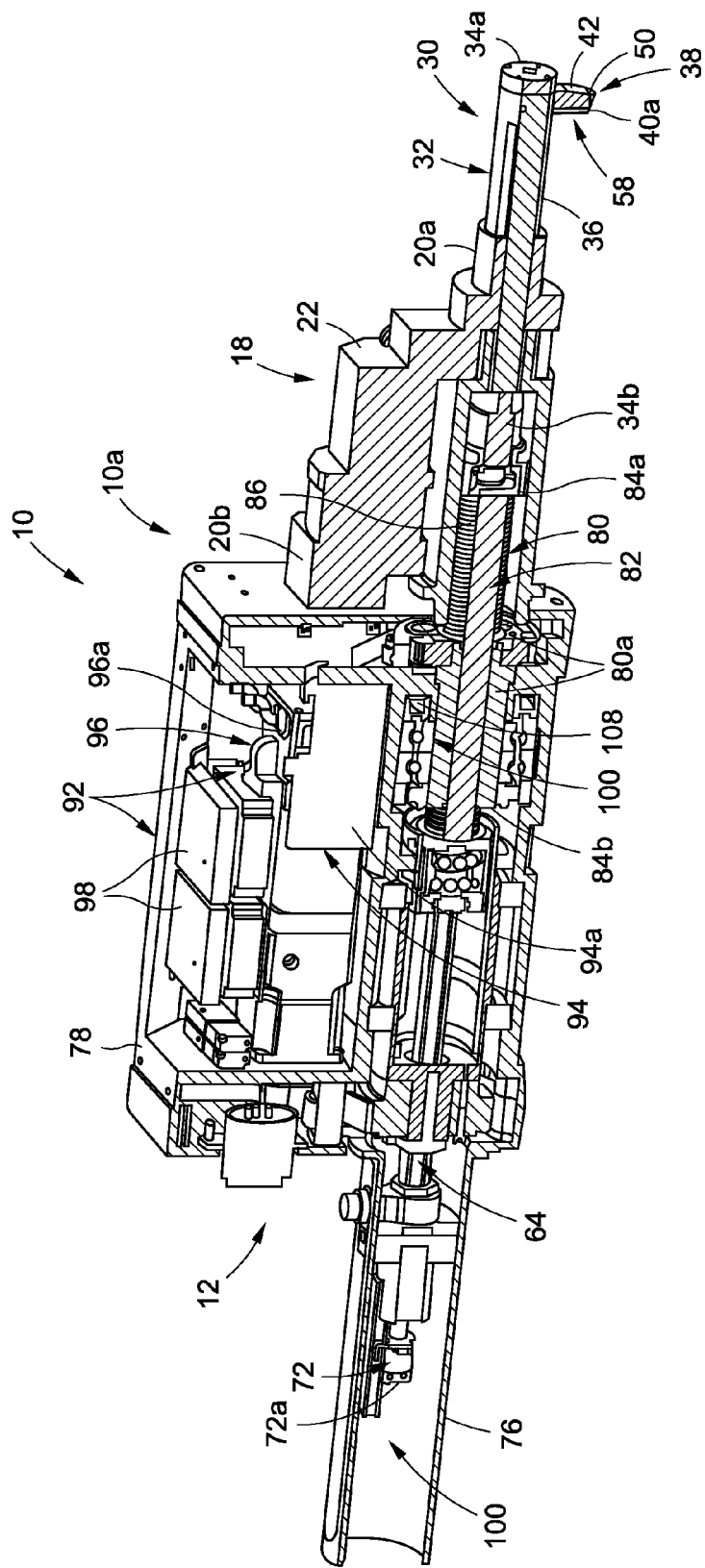
FIG. 1B is a left side perspective view in partial cross-section of the back spotfacing system of FIG. 1A.

Now referring to the Figures, FIG. 1A is a cross-sectional side view of an embodiment of a back spotfacing system 10 of the disclosure. FIG. 1B is a left side perspective view in partial cross-section of the back spotfacing system 10 of FIG. 1A. As shown in FIGS. 1A-1B, preferably, the back spotfacing system 10 is an automated back spotfacing system 10a. The back spotfacing system 10 (see FIGS. 1A-1B) may also be manually operated in certain embodiments. As used herein, "back spotfacing" means a secondary mechanical process to machine, mill, or cut a surface, e.g., back spotface, around the outside of a previously drilled or formed hole, for example, a fastener, bolt, or screw hole, where the surface is concentric and perpendicular to the axis of the hole, and allows a head of the fastener, bolt, or screw, a nut, or another object to be seated on the surface of the hole, to be evenly tightened down on the surface, and further means machining, milling, or cutting such surface on the backside or far side (away from the machine side) of a workpiece or part, or on the inside of a structure.

As shown in FIGS. 1A-1B, the back spotfacing system 10 comprises a machining apparatus 12, such as a machining apparatus for performing machining, milling, cutting, drilling or another suitable shaping operation, and capable of performing back spotfacing. For example, the machining apparatus 12 may comprise a CNC (computer numerical controlled) machine, preferably with a closed-loop control system, a milling machine, or another suitable machine capable of performing back spotfacing.

As shown in FIG. 1A, the machining apparatus 12 has a first end 14a, a second end 14b, and a body portion 16 therebetween. The machining apparatus 12 (see FIGS. 1A-1B) has an expanding collet 18 (see FIGS. 1A-1B) attached to the first end 14a (see FIG. 1A) of the machining apparatus 12 (see FIG. 1A). As shown in FIG. 1A, the expanding collet 18 has a first end 20a, a second end 20b, and an expandable body portion 22 therebetween.

The first end 20a (see FIGS. 1A-1B) of the expanding collet 18 (see FIGS. 1A-1B) is preferably configured to engage a workpiece 24 (see FIG. 1A) or part 220 (see FIG. 11) to be back spotfaced, or to engage a calibration workpiece 24a (see FIG. 9) that has been previously back spotfaced and is used for calibration. The workpiece 24 (see FIG. 1A) (or the calibration workpiece 24a (see FIG. 9)) preferably has a hole 26 (see FIG. 1A), such as a through hole 26a (see FIG. 1A), formed through the workpiece 24 (see FIG. 1A) (or the calibration workpiece 24a (see FIG. 9)). As used herein, "workpiece" means a piece of metal, composite, or other material that is in the process of being cut or shaped, including back spotfaced, or has been cut or shaped, including back spotfaced, by performing machining, milling, or other cutting or shaping operations, including back spotfacing, with a machine or tool.

The workpiece 24 (see FIG. 1A) (or the calibration workpiece 24a (see FIG. 9)) has a first side 28a (see FIG. 1A), a second side 28b (see FIG. 1A), and a body portion 29 (see FIG. 1A) therebetween. When the workpiece 24 (see FIG. 1A) (or the calibration workpiece 24a (see FIG. 9)) is engaged or attached to the first end 20a (see FIG. 1A) of the expanding collet 18 (see FIG. 1A), the first side 28a (see FIG. 1A) faces towards the machining apparatus 12 (see FIG. 1A) and the second side 28b (see FIG. 1A) faces away from the machining apparatus 12 (see FIG. 1A).

As shown in FIGS. 1A-1B, the machining apparatus 12 further comprises a through-hole cutter tool 30 attached to the machining apparatus 12. The through-hole cutter tool 30 (see FIGS. 1A-1B) comprises an elongate member 32 (see FIGS. 1A-1B). The elongate member 32 (see FIGS. 1A-1B) has a first end 34a (see FIGS. 1A-1B), a second end 34b (see FIGS. 1A-1B), and a cylindrical body portion 36. As shown in FIGS. 1A-1B, preferably the second end 34b of the elongate member 32 is attached to the machining apparatus 12 and is inserted through the first end 20a, through the expandable body portion 22, and through the second end 20b of the expanding collet 18.

When the workpiece 24 (see FIG. 1A) is engaged or coupled to the machining apparatus 12 (see FIG. 1A) via the expanding collet 18 (see FIG. 1A), the elongate member 32 (see FIG. 1A) is movable to coaxially extend through the hole 26 (see FIG. 1A) in the workpiece 24 (see FIG. 1A) from the first side 28a (see FIG. 1A), or frontside, of the workpiece 24 (see FIG. 1A) towards the second side 28b (see FIG. 1A), or backside, of the workpiece 24 (see FIG. 1A).

As shown in FIGS. 1A-1B, the through-hole cutter tool 30 further comprises a cutter element 38. The cutter element 38 (see FIGS. 1A-1B) has a distal end 40a (see FIGS. 1A-1B), a proximal end 40b (see FIG. 1A), and a body portion 42 (see FIGS. 1A-1B) therebetween.

The cutter element 38 (see FIGS. 1A-1B, 3B) comprises a cutter portion 44 (see FIG. 3B) attached to a cutting side 46 (see FIGS. 1A, 3B) of the cutter element 38 (see FIGS. 1A-1B, 3B). The cutter portion 44 (see FIGS. 1A-1B) is configured to cut, machine and back spotface a surface 48 (see FIG. 1A) on the second side 28b (see FIG. 1A) of the workpiece 24 (see FIG. 1A), where the surface 48 (see FIG. 1A) has a cut depth 130 (see FIG. 9). Once the cutter portion 44 of the through-hole cutter tool 30 performs a back spotfacing cutting operation 144 (see FIG. 9), the surface 48 (see FIG. 1A) is faced to form a back spotface 49 (see FIG. 9).

The cutter element 38 (see FIGS. 1A, 3B) further comprises a probe tip 50 (see FIGS. 1A, 3B) attached at the distal end 40a (see FIGS. 1A, 3B) of the cutter element 38 (see FIGS. 1A, 3B). The probe tip 50 (see FIGS. 1A, 3B) preferably has a rounded or ball-shaped configuration and is preferably made of a metal material, such as brass, steel, or another suitable material. However, the probe tip 50 (see FIGS. 1A, 3B) may also be made of another smooth and durable material. The probe tip 50 (see FIGS. 1A, 4B) is configured to contact an inner surface 52 (see FIG. 4B) of the hole 26 (see FIG. 4B). The probe tip 50 (see FIGS. 1A, 3B, 4B) preferably provides a smooth, predictable surface. As shown in FIG. 1A, the cutter element 38 is adjacent a connector piece 66 housed within the elongate member 32.

The cutter element 38 (see FIGS. 1A-1B, 2A, 4A) is pivotal via a pivot mechanism 53 (see FIG. 1A) between a stowed position 54 (see FIGS. 2A, 4A) on the elongate member 32 (see FIGS. 2A, 4A), a contact position 56 (see FIG. 4B) with the inner surface 52 (see FIG. 4B) of the hole 26 (see FIG. 4B), and an extended position 58 (see FIGS. 1A-1B, 2B, 4C, 5A-5B) disengaged from the inner surface 52 (see FIG. 4B) of the hole 26 (see FIGS. 4B, 4C), and extending radially from the elongate member 32 (see FIGS. 1A-1B, 2B, 4C, 5A-5B). The pivot mechanism 53 (see FIG. 1A) is preferably attached to the body portion 42 (see FIG. 1A) of the cutter element 38 (see FIG. 1A) near the proximal end 40b (see FIG. 1A) of the cutter element 38 (see FIG. 1A), and the pivot mechanism 53 (see FIG. 1A) is perpendicular to a longitudinal feed axis 60 (see FIG. 1A). The pivot mechanism 53 (see FIG. 1A) may comprise a pivot pin with a flexural pin joint and/or spring element, or may comprise another suitable pivot mechanism.

In the extended position 58 (see FIGS. 1A, 5B), the cutter element 38 (see FIGS. 1A, 5B) sufficiently extends to machine and back spotface the surface 48 (see FIGS. 1A, 5B) on the second side 28b (see FIGS. 1C, 5B) of the workpiece 24 (see FIGS. 1A, 5B) (or the calibration workpiece 24a (see FIG. 9)) opposite the first side 28a (see FIG. 1A) of the workpiece 24 (see FIG. 1A). When the cutter element 38 (see FIGS. 1A, 5B) sufficiently extends to machine and back spotface the surface 48 (see FIGS. 1A, 5B) on the second side 28b (see FIGS. 1C, 5B) of the workpiece 24 (see FIGS. 1A, 5B) at a surface contact position 106 (see FIG. 5B), feed axis thrust 126 (see FIG. 9) measured with one or more load cells 108 (see FIG. 9) was greater than 25 (twenty-five) pounds of force or load, for example, about 40-50 (forty to fifty) pounds, or greater, of force or load, when the cutter element 38 (see FIGS. 5A, 9) was engaged in cutting the back spotface cut 132 (see FIGS. 6A-6B, 9) on the second side 28b (see FIG. 5A) of the workpiece 24 (see FIG. 5A). Feed axis thrust 126 (see FIG. 9) measured with one or more load cells 108 (see FIG. 9) was 0 (zero) pounds of force or load when the cutter element 38 (see FIGS. 5A, 9) was not in contact with the surface 48 (see FIG. 5A) on the second side 28b (see FIG. 5A) of the workpiece 24 (see FIG. 5A), and feed axis thrust 126 (see FIG. 9) measured with one or more load cells 108 (see FIG. 9) was about 25 (twenty-five) pounds of force or load when the cutter element 38 (see FIGS. 5A, 9) contacted the surface 48 (see FIG. 5B) on the second side 28b (see FIG. 5B) of the workpiece 24 (see FIG. 5B) at the surface contact position 106 (see FIG. 5B).

The surface 48 (see FIGS. 1A, 5B) is preferably concentric and perpendicular to the hole 26 (see FIGS. 1A, 5B), and perpendicular to the longitudinal feed axis 60 (see FIG. 1A) through the hole 26 (see FIG. 1A) and through the elongate member 32 (see FIG. 1A).

As discussed in further detail below, the through-hole cutter tool 30 (see FIG. 1A) is also used to measure geometries 25 (see FIG. 9) of the workpiece 24 (see FIG. 1A) or part 220 (see FIG. 11), so that a precise cut depth 131 (see FIG. 9) may be calculated based on cut depth requirements 140 (see FIG. 9).

FIG. 2A is an illustration of a perspective, close-up, cut-away view of an embodiment of the through-hole cutter tool 30 that may be used in an exemplary embodiment of the back spotfacing system 10 (see FIGS. 1A-1B) and a back spotfacing method 180 (see FIG. 10) of the disclosure. FIG. 2A shows the cutter element 38 in the stowed position 54 within the elongate member 32. FIG. 2A further shows the first end 34a, and partially shows the cylindrical body portion 36, of the elongate member 32. As further shown in FIG. 2A, the elongate member 32 has a recessed opening 62 through which the cutter element 38 can be stowed and can extend or flip out from inside the elongate member 32 to outside the elongate member 32. As further shown in FIG. 2A, the connector piece 66 is housed within the recessed opening 62 of the elongate member 32. The connector piece 66 (see FIG. 2A) preferably connects the cutter element 38 to an elongated drawbar 64 (see FIG. 2B).

FIG. 2B is an illustration of a perspective close-up view of the through-hole cutter tool 30 of FIG. 2A, showing the cutter element 38 in the extended position 58 extending from the elongate member 32. FIG. 2B shows the distal end 40a, the proximal end 40b, and the body portion 42 of the cutter element 38. FIG. 2B further shows the cutter portion 44 attached to the cutting side 46 of the cutter element 38. As shown in FIG. 2B, the cutter element 38 is preferably actuated by the elongated drawbar 64 (see also FIG. 1A) which partially extends through the elongate member 32. The elongated drawbar 64 (see FIG. 2B) may preferably be coupled to the cutter element 38 (see FIG. 2B) via the connector piece 66 (see FIGS. 2A-2B), to effect actuation of the cutter element 38 (see FIG. 2B) to pivot from the stowed position 54 (see FIG. 2A) to the extended position 58 (see FIG. 2B).

As shown in FIGS. 1A-1B, the machining apparatus 12 comprises the elongated drawbar 64 which is preferably actuated by a drawbar actuator 68 coupled to the elongated drawbar 64. The drawbar actuator 68 (see FIG. 1A) may be in the form or a pneumatic actuator 68a (see FIG. 1A) having one or more air cylinders 69 (see FIG. 1A), or may comprise another suitable actuator mechanism.

As further shown in FIG. 1A, the elongated drawbar 64 has a first end 70a within the elongate member 32 of the through-hole cutter tool 30 and coupled to the cutter element 38 (see FIG. 1A) via the connector piece 66 (see FIGS. 2A-2B). The elongated drawbar 64 (see FIG. 1A) has a second end 70b (see FIG. 1A) coupled to one or more sensors 72 (see FIGS. 1A-1B), for example, such as in the form of a position sensor 72a (see FIG. 1A). The position sensor 72a may comprise a drawbar position sensor, a linear position sensor, or other suitable sensors. The one or more sensors 72 (see FIGS. 1A-1B) are components of the measurement system 100, discussed in detail below. The position sensor 72a (see FIG. 1A) may be used to sense a drawbar position 73 (see FIG. 9) of the elongated drawbar 64 (see FIG. 1A), when the cutter element 38 (see FIGS. 1A, 4C) extends or flips out to the extended position 58 (see FIGS. 1A, 4C).

Figure 3:
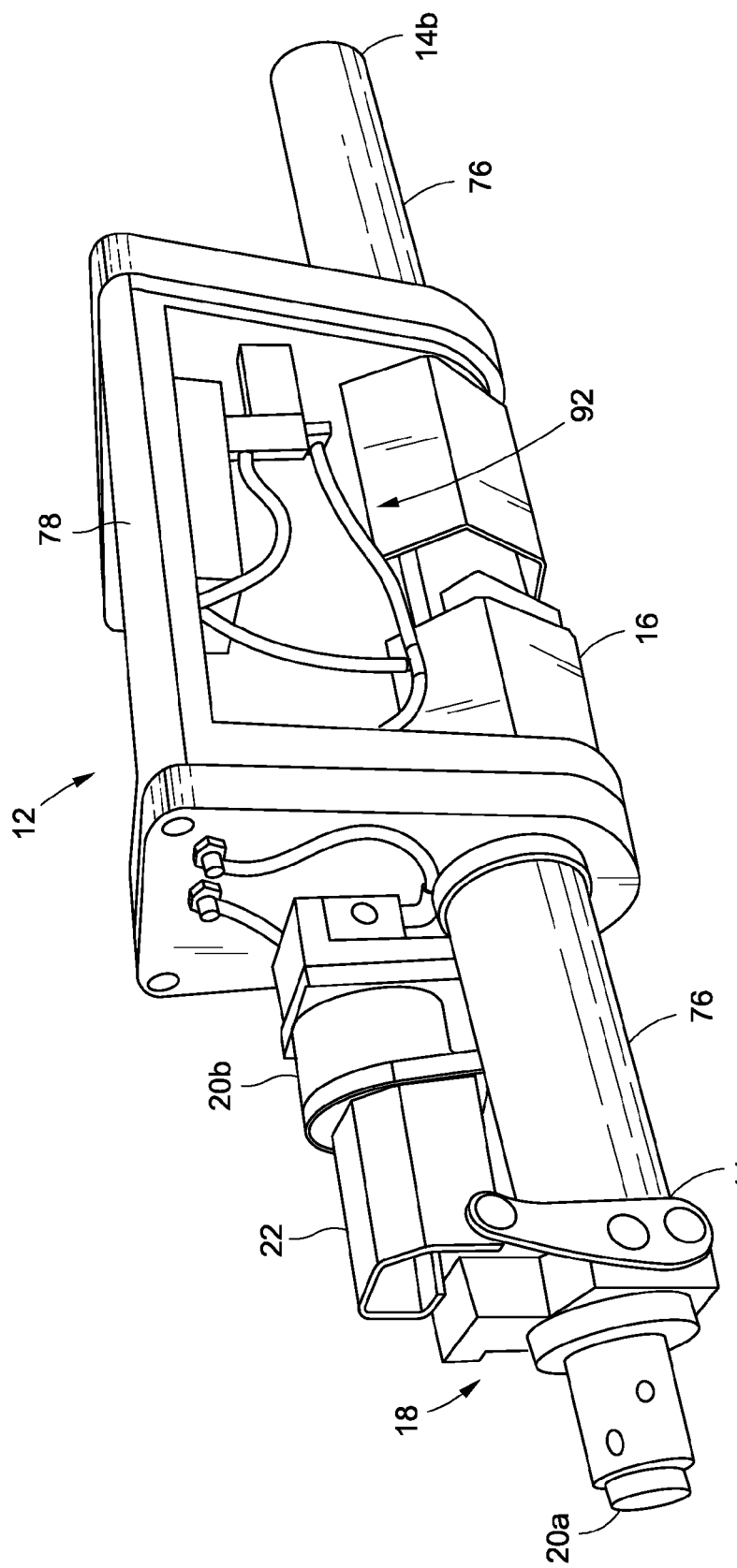
FIG. 3 is a right side perspective view of an embodiment of a machining apparatus that may be used in an embodiment of a back spotfacing system and method of the disclosure.

The elongated drawbar 64 (see FIG. 1A) has an elongated body portion 74 that extends through an elongated housing portion 76 (see FIGS. 1A-1B, 3) and through a main housing portion 78 (see FIGS. 1A-1B, 3) of the machining apparatus 12 (see FIGS. 1A-1B, 3). The elongated housing portion 76 (see FIGS. 1A-1B) and the main housing portion 78 (see FIGS. 1A-1B) preferably also house at least a feed axis member 80 (see FIGS. 1A-1B) and an elongated rotating member 82 (see FIGS. 1A-1B).

The feed axis member 80 (see FIG. 1B) may be in the form of a ball screw and ball screw nut assembly 80a (see FIG. 1B), a lead screw, or another suitable feed axis mechanism. As shown in FIG. 1B, the feed axis member 80 has a first end 84a, a second end 84b, and a body portion 86 therebetween. The first end 84a (see FIG. 1B) of the feed axis member 80 (see FIG. 1B) is preferably coupled to the second end 34b (see FIG. 1B) of the elongate member 32 (see FIG. 1B) of the through-hole cutter tool 30 (see FIG. 1B). The feed axis member 80 (see FIGS. 1A-1B) is configured to actuate the elongate member 32 (see FIG. 1A), by extending and retracting the elongate member 32 (see FIGS. 1A-1B) through the hole 26 (see FIG. 1A) of the workpiece 24 (see FIG. 1A).

The elongated rotating member 82 (see FIG. 1A) may be in the form of a spindle 82a (see FIG. 1A) or another suitable rotating mechanism. As shown in FIG. 1A, the elongated rotating member 82 has a first end 88a, a second end 88b, and a body portion 90 therebetween. The first end 88a (see FIG. 1A) of the elongated rotating member 82 (see FIG. 1A) is preferably coupled to the second end 34b (see FIG. 1A) of the elongate member 32 (see FIG. 1A) of the through-hole cutter tool 30 (see FIG. 1A). The elongated rotating member 82 (see FIG. 1A) is configured to rotate or spin the elongate member 32 (see FIG. 1A).

As show in FIGS. 1A-1B, the back spotfacing system 10 further comprises a power system 92 for powering the machining apparatus 12 and the through-hole cutter tool 30. The power system 92 (see FIGS. 1A-1B) is preferably housed in the main housing portion 78 (see FIGS. 1A-1B) of the machining apparatus 12 (see FIGS. 1A-1B). As shown in FIG. 1B, the power system 92 preferably comprises a first motor 94, such as in the form of a feed axis motor 94a, configured for driving the feed axis member 80 forward and backward in order to actuate and extend and retract the elongate member 32 (see FIG. 1B).

As shown in FIGS. 1A-1B, the power system 92 preferably further comprises a second motor 96, such as in the form of a spindle motor 96a, configured for rotating the elongated rotating member 82 to rotate the elongate member 32. As shown in FIGS. 1A-1B, the power system 92 further comprises two or more motor controllers 98 for controlling the first motor 94 and the second motor 96. The power system 92 is preferably electrical. However, a pneumatic power system, a combination of an electrical and pneumatic power system, a hydraulic power system, or another suitable power system may also be used.

The first motor 94 (see FIGS. 1A-1B) and the second motor 96 (see FIGS. 1A-1B) may each comprise a servomotor such as a positional rotation servomotor, a continuous rotation servomotor, or a linear servomotor; a DC (direct current) motor; another type of electrical motor; a pneumatic motor; a hydraulic motor; or another suitable motor. A servomotor is suitable for use in a closed-loop control system, and the servomotor typically comprises an assembly of components, such as, a DC (direct current) motor, a gear reduction unit, a position sensing device, for example, a potentiometer, and a control circuit. The servomotor incorporates position feedback from a sensor to allow for accurate positioning.

As shown in FIGS. 1A-1B, the back spotfacing system 10 further comprises a measurement system 100 coupled to the machining apparatus 12 for measuring one or more hole exit positions 102 (see FIGS. 4B, 9) of the cutter element 38 (see FIGS. 4B, 9) along an edge 104 (see FIG. 4B) of the hole 26 (see FIG. 4B). The measurement system 100 further measures one or more surface contact positions 106 of the cutter element 38 (see FIGS. 5B, 9) on the surface 48 (see FIG. 5B) of the second side 28b (see FIG. 5B) of the workpiece 24 (see FIG. 5B).

As shown in FIGS. 1A-1B, the measurement system 100 preferably comprises the one or more sensors 72, such as in the form of position sensors 72a. The one or more sensors 72 may preferably be used to measure each hole exit position 102 (see FIGS. 4B, 9) based on sensing the drawbar position 73 (see FIG. 9) at the point when the cutter element 38 (see FIGS. 1A-1B, 4B) disengages from the inner surface 52 (see FIG. 4B) of the hole 26 (see FIG. 4B) and pivots to extend or flip out to the extended position 58 (see FIG. 4C).

As shown in FIGS. 1A-1B, the measurement system 100 further comprises one or more load cells 108. The one or more load cells 108 (see FIGS. 1A-1B) may preferably be used to measure each surface contact position 106 (see FIG. 5B) of the cutter element 38 (see FIG. 5B) on the surface 48 (see FIG. 5B), by measuring a load 110 (see FIG. 9) applied to the elongate member 32 (see FIGS. 1A-1B, 5B, 9), when the cutter element 38 (see FIGS. 1A-1B, 5B, 7) is in the extended position 58 (see FIGS. 1A-1B, 5B, 9) and the elongate member 32 (see FIGS. 1A-1B, 5B, 9) is retracted to move the cutter element 38 (see FIGS. 1A-1B, 5B, 9) towards the surface 48 (see FIGS. 1A-1B, 5B, 9) to contact the surface 48 (see FIGS. 1A-1B, 5B, 9). The one or more load cells 108 (see FIGS. 1A-1B, 9), may be in the form of a sensor or a transducer that converts a load or force acting on it into an electronic signal, where the electronic signal may be a voltage change, a current change, or a frequency change, depending on the type of load cell and circuitry used.

FIG. 3 is a right side perspective view of an embodiment of the machining apparatus 12 that may be used an exemplary embodiment of the back spotfacing system 10 (see FIGS. 1A-1B) and the back spotfacing method 180 (see FIG. 10) of the disclosure. FIG. 3 shows the machining apparatus 12 without the through-hole cutter tool 30 attached. FIG. 3 shows the first end 14a, the second end 14b, and the body portion 16 of the machining apparatus 12. FIG. 3 further shows the first end 20a, the second end 20b, and the expandable body portion 22 of the expanding collet 18. FIG. 3 further shows the elongated housing portion 76, and also shows the main housing portion 78 housing the power system 92.

FIGS. 4A-4C are illustrations of a perspective, close-up, cut-away view of an embodiment of a through-hole cutter tool 30 that may be used in an exemplary embodiment of the back spotfacing system 10 (see FIGS. 1A-1B) and the back spotfacing method 180 (see FIG. 10) of the disclosure. FIGS. 4A-4C show the through-hole cutter tool 30 at various steps 112a-112c of an internal probe operation 112 performed on the workpiece 24. The internal probe operation 112 (see FIGS. 4A-4C) may be used to obtain one or more internal probe measurements 114 (see FIG. 9), including one or more hole exit positions 102 (see FIGS. 4B, 9) of the cutter element 38 (see FIGS. 4B, 9) along the edge 104 (see FIG. 4B) of the hole 26 (see FIG. 4B).

In FIGS. 4A-4C, the elongate member 32 of the through-hole cutter tool 30 is inserted through the hole 26 of the workpiece 24. As further shown in FIGS. 4A-4C, the first end 34a of the elongate member 32 protrudes through the second side 28b, or backside, of the workpiece 24 and is surrounded by the surface 48 to be measured and/or back spotfaced, or in the case of the calibration workpiece 24a (see FIG. 9), the surface that has been previously back spotfaced and is to be used to calibrate the through-hole cutter tool 30.

As shown in FIG. 4A, the internal probe operation 112 comprises step 112a of applying pressure (←P) to the through-hole cutter tool 30 to try to extend or flip out the cutter element 38 from the stowed position 54, in which it is retracted or stowed on and within the elongate member 32. In particular, the pressure (←P) may be applied to the cutter element 38 (see FIG. 4A) of the through-hole cutter tool 30 (see FIG. 4A) by the elongated drawbar 64 (see FIGS. 1A-1B) being actuated by the drawbar actuator 68 (see FIGS. 1A-1B), such as in the form of pneumatic actuator 68a (see FIG. 1A), having one or more air cylinders 69 (see FIG. 1A). The pressure (←P) from the one or more air cylinders 69 (see FIG. 1A) pushes the first end 70a (see FIG. 1A) of the elongated drawbar 64 (see FIGS. 1A, 4A) against the cutter element 38 (see FIGS. 1A, 4A) of the through-hole cutter tool 30 (see FIGS. 1A, 4A).

As shown in FIG. 4B, the internal probe operation 112 comprises step 112b of further applying an effective amount of pressure (←P) to the cutter element 38 by the elongated drawbar 64 (see FIGS. 1A-1B), to cause the cutter element 38 to pivot or partially extend to the contact position 56 with the inner surface 52 of the hole 26. In the contact position 56 (see FIG. 4B), the probe tip 50 (see FIG. 4B) of the cutter element 38 (see FIG. 4B) engages or contacts the inner surface 52 (see FIG. 4B) of the hole 26 (see FIG. 4B) and rides against the inner surface 52 (see FIG. 4B) of the hole 26 (see FIG. 4B), as the elongated drawbar 64 (see FIG. 1A)

extends forward and pushes the cutter element 38 (see FIG. 4B). As shown in FIG. 4B, the cutter element 38 is unable to extend or flip out until it is outside the hole 26.

As shown in FIG. 4C, the internal probe operation 112 comprises step 112c of further applying an even greater effective pressure (←P) to the cutter element 38, so that the cutter element 38 rapidly pivots, extends or flips out to the extended position 58. As further shown in FIG. 4C, in the extended position 58, the probe tip 50 of the cutter element 38 is disengaged from the inner surface 52 of the hole 26, and the cutter element 38 extends radially from the elongate member 32. The cutter element 38 (see FIG. 4C) extends to be able to machine and back spotface the surface 48 (see FIG. 4C) on the second side 28b (see FIG. 4C) of the workpiece 24 (see FIG. 4C) opposite the first side 28a (see FIG. 1A). The sensor 72 (see FIG. 1A), such as in the form of position sensor 72a (see FIG. 1A), senses or records the drawbar position 73 (see FIG. 9) at the point when the cutter element 38 pivots to extend or flip out of the hole 26, thus measuring and obtaining the hole exit position 102.

Preferably, the steps 112a-112c (see FIGS. 4A-4C) of the internal probe operation 112 (see FIGS. 4A-4C) are repeated to obtain additional internal probe measurements 114 (see FIG. 9), including multiple hole exit positions 102 (see FIGS. 4B, 4C), that represent the edge 104 (see FIGS. 4B, 4C) of the hole 26 (see FIGS. 4B, 4C). For example, when the internal probe operation 112 (see FIGS. 4A-4C) is repeated following step 112c (see FIG. 4C), the cutter element 38 is pivoted back to the stowed position 54 (see FIG. 4A) from the extended position 58 (see FIG. 4C), the elongated drawbar 64 (see FIG. 1A) is retracted or pulled back slightly, the elongate member 32 (see FIGS. 4A-4C) is rotated to another position along the exit of the hole 26 (see FIGS. 4A-4C), and step 112a (see FIG. 4A), step 112b (see FIG. 4B), and step 112c (see FIG. 4C) are repeated. The elongate member 32 (see FIGS. 4A-4C) may be rotated to as many positions along the exit of the hole 26 (see FIGS. 4A-4C) as desired, and the internal probe operation 112 may be repeated as many times as desired, to obtain a hole exit profile 116 or geometry.

The internal probe measurements 114 (see FIG. 9) may be recorded and collected by the one or more sensors 72 (see FIGS. 1A-1B) of the measurement system 100 (see FIGS. 1A-1B) of the back spotfacing system 10 (see FIGS. 1A-1B). The sensor output and recorded and collected data of the internal probe measurements 114 (see FIG. 9) may be analyzed with a measurement analysis system 118 (see FIG. 9), discussed in detail below, and may, for example, be used to map out the shape of the hole 26 (see FIGS. 1A, 4A-4C) in a cylindrical coordinate system 120 (see FIG. 9).

FIGS. 5A-5B are illustrations of a perspective, close-up, cut-away view of an embodiment of a through-hole cutter tool 30 that may be used in an exemplary embodiment of the back spotfacing system 10 (see FIGS. 1A-1B) and the back spotfacing method 180 (see FIG. 10) of the disclosure. FIGS. 5A-5B show the through-hole cutter tool 30 at various steps 122a-122b of an external probe operation 122 performed on the workpiece 24. The external probe operation 122 (see FIGS. 5A-5B) may be used to obtain one or more external probe measurements 124 (see FIG. 9), including one or more surface contact positions 106 (see FIG. 5B) of the cutter element 38 (see FIG. 5B) on the surface 48 (see FIG. 5B) of the second side 28b (see FIG. 5B) of the workpiece 24 (see FIG. 5B).

In FIGS. 5A-5B, the elongate member 32 of the through-hole cutter tool 30 is inserted through the hole 26 of the workpiece 24. As further shown in FIGS. 5A-5B, the first end 34a of the elongate member 32 protrudes through the second side 28b of the workpiece 24 and is surrounded by the surface 48 to be measured and/or back spotfaced, or in the case of the calibration workpiece 24a (see FIG. 9), the surface that has been previously back spotfaced and is to be used to calibrate the through-hole cutter tool 30.

As shown in FIG. 5A, the external probe operation 122 comprises step 122a of applying an effective pressure (←P) or force to the through-hole cutter tool 30 to extend or flip out the cutter element 38 from the stowed position 54 (see FIG. 4A) on and within the elongate member 32 (see FIGS. 4A, 5A) to the extended position 58 (see FIG. 5A). In particular, the pressure (←P) may be applied to the cutter element 38 (see FIG. 5A) of the through-hole cutter tool 30 (see FIG. 5A) by the elongated drawbar 64 (see FIGS. 1A-1B) being actuated by the drawbar actuator 68, such as in the form of pneumatic actuator 68a (see FIG. 1A), having one or more air cylinders 69 (see FIG. 1A). The pressure (←P) from the one or more air cylinders 69 (see FIG. 1A) pushes the first end 70a (see FIG. 1A) of the elongated drawbar 64 (see FIG. 1A) against the cutter element 38 (see FIGS. 1A, 5A) of the through-hole cutter tool 30 (see FIGS. 1A, 5A) to extend or flip out the cutter element 38 (see FIG. 5A) to the extended position 58 (see FIG. 5A).

As shown in FIG. 5B, the external probe operation 122 further comprises step 122b of retracting the through-hole cutter tool 30 towards the hole 26 in a direction (D→), so that the elongate member 32 is retracted through the hole 26 until the cutter element 38 in the expanded position 58 contacts the surface 48 of the second side 28b of the workpiece 24 at the surface contact position 106. The one or more load cells 108 (see FIGS. 1A-1B) measure each surface contact position 106 (see FIG. 5C) of the cutter element 38 (see FIG. 5C) on the surface 48 (see FIG. 5C), by measuring a load 110 (see FIG. 9) applied to the elongate member 32 (see FIG. 5C) and measuring a feed axis thrust 126 (see FIG. 9) of the cutter element 38 (see FIG. 5C) against the surface 48 (see FIG. 5C). The one or more load cells 108 (see FIGS. 1A-1B) record the surface contact position 106 (see FIG. 5C) of the cutter element 38 (see FIG. 5C) on the surface 48 (see FIG. 5C), when there is an increase or a spike in the feed axis thrust 126 (see FIG. 9). In addition, the feed axis motor 94 (see FIG. 1A) may also sense when the cutter element 38 (see FIG. 5C) comes into contact with the surface 48 (see FIG. 5C) by exhibiting an increase in current. Examples of feed axis thrust 126 (see FIG. 9) measured with the one or more load cells 108 (see FIG. 9) included: 0 (zero) pounds of force or load when the cutter element 38 (see FIGS. 5A, 9) was not in contact with the surface 48 (see FIG. 5A) on the second side 28b (see FIG. 5A) of the workpiece 24 (see FIG. 5A) at the surface contact position 106 (see FIG. 5B); about 25 (twenty-five) pounds of force or load when the cutter element 38 (see FIGS. 5B, 9) contacted the surface 48 (see FIG. 5B) on the second side 28b (see FIG. 5B) of the workpiece 24 (see FIG. 5B) at the surface contact position 106 (see FIG. 5B); and greater than 25 (twenty-five) pounds of force or load, for example, about 40-50 (forty to fifty) pounds, or greater, of force or load, when the cutter element 38 (see FIG. 5B) was engaged in cutting the back spotface cut 132 (see FIGS. 6A-6B, 9) on the second side 28b (see FIG. 5B) of the workpiece 24 (see FIG. 5B).

Preferably, the steps 122a-122c (see FIGS. 5A-5B) of the external probe operation 122 (see FIGS. 5A-5B) are repeated to obtain additional external probe measurements 124 (see FIG. 9), including one or more surface contact positions 106 (see FIG. 5B) of the cutter element 38 (see FIG. 5B) on the surface 48 (see FIG. 5B) of the second side 28b (see FIG. 5B) of the workpiece 24 (see FIG. 5B). For example, when the external probe operation 122 (see FIGS. 5A-5B) is repeated following step 122b (see FIG. 5B), the cutter element 38 (see FIG. 5B) is moved away from the surface 48 (see FIGS. 5A-5B), the elongate member 32 (see FIGS. 5A-5B) is rotated to another position along the surface 48 (see FIGS. 5A-5B), and step 122a (see FIG. 5A) and step 122b (see FIG. 5B) are repeated. The elongate member 32 (see FIGS. 5A-5B) may be rotated to as many positions along the surface 48 (see FIGS. 5A-5B) as desired, and the external probe operation 122 may be repeated as many times as desired, to obtain a surface profile 128 (see FIG. 9) or geometry of the surface 48 (see FIGS. 5A-5B) that has been externally probed.

The external probe measurements 124 (see FIG. 9) may be recorded and collected by the one or more load cells 108 (see FIGS. 1A-1B) of the measurement system 100 (see FIGS. 1A-1B) of the back spotfacing system 10 (see FIGS. 1A-1B). The load cell output and recorded and collected data of the external probe measurements 124 (see FIG. 9) may be analyzed with the measurement analysis system 118 (see FIG. 9), discussed in detail below, and may, for example, be used to map out the surface profile 128 (see FIG. 9) of the surface 48 (see FIGS. 5A-5B) that has been externally probed in a cylindrical coordinate system 120 (see FIG. 9).

A system logic 172 (see FIG. 9), such as in the form of an algorithm 172a (see FIG. 9), of the measurement analysis system 118 (see FIG. 9), may be used to determine the hole exit profile 116 (see FIG. 9) and the surface profile 128 (see FIG. 9), by using the internal probe measurements 114 (see FIG. 9), such as the hole exit positions 102 (see FIG. 9), and the external probe measurements 124 (see FIG. 9), such as the surface contact positions 106. The hole exit profile 116 (see FIG. 9) and the surface profile 128 (see FIG. 9) may then be used to calculate the cut start position 136a (see FIGS. 6A-6B) and the cut end position 138b (see FIGS. 6A-6B) to obtain a precise cut depth 131 (see FIG. 9) of a back spotface cut 132 (see FIGS. 6A-6B, 9) to be made on a workpiece 24 (see FIGS. 6A-6B, 9) or part 220 (see FIG. 11). The back spotface cut 132 (see FIG. 9) having the precise cut depth 131 (see FIG. 9) may then be cut or made using the back spotfacing system 10 (see FIGS. 1A-1B) and the back spotfacing method 180 (see FIG. 10).

FIG. 6A is a cross-sectional side view of a back spotface cut 132, such as back spotface cut 132a, that is cut into a planar surface 134 of workpiece 24 having hole 26. The back spotface cut 132a (see FIG. 6A) may be cut using an exemplary embodiment of the back spotfacing system 10 (see FIGS. 1A-1B) and the back spotfacing method 180 (see FIG. 10) of the disclosure. As shown in FIG. 6A, the back spotface cut 132a has a precise cut depth 131, such as in the form of precise cut depth 131a, having a cut start position 136a and a cut end position 136b. The cut start position 136a (see FIG. 6A) and the cut end position 136b (see FIG. 6A) may be calculated based on the hole exit profile 116 (see FIG. 9) and the surface profile 128 (see FIG. 9) calculated from the internal probe measurements 114 (see FIG. 9) obtained using the internal probe operation 112 (see FIGS. 4A-4C) and the external probe measurements 124 (see FIG. 9) obtained using the external probe operation 124 (see FIGS. 5A-5B).

FIG. 6B is a cross-sectional side view of a back spotface cut 132, such as back spotface cut 132b, that is cut into a curved surface 138 of workpiece 24 having hole 26. The back spotface cut 132b (see FIG. 6B) may be cut using an exemplary embodiment of the back spotfacing system 10 (see FIGS. 1A-1B) and the back spotfacing method 180 (see FIG. 10) of the disclosure. As shown in FIG. 6B, the back spotface cut 132b has a precise cut depth 131, such as in the form of precise cut depth 131b, having a cut start position 136a and a cut end position 136b. The cut start position 136a (see FIG. 6B) and the cut end position 136b (see FIG. 6B) may be calculated based on the hole exit profile 116 (see FIG. 9) and the surface profile 128 (see FIG. 9) calculated from internal probe measurements 114 (see FIG. 9) obtained using the internal probe operation 112 (see FIGS. 4A-4C) and the external probe measurements 124 (see FIG. 9) obtained using the external probe operation 124 (see FIGS. 5A-5B).

Figure 7:
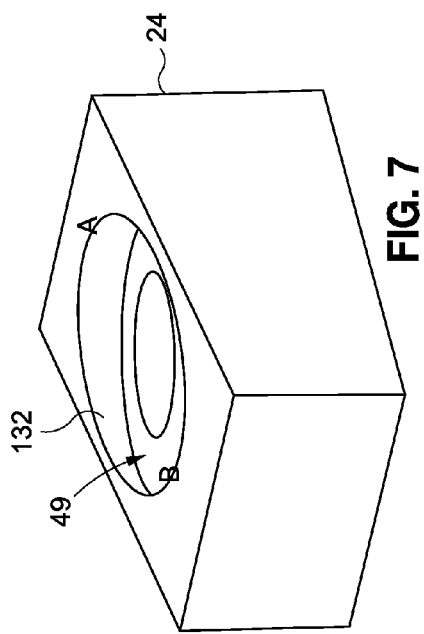
FIG. 7 is an illustration of a perspective view of a workpiece with a back spotface cut formed using an exemplary embodiment of a back spotfacing system and method of the disclosure.
Figure 8:
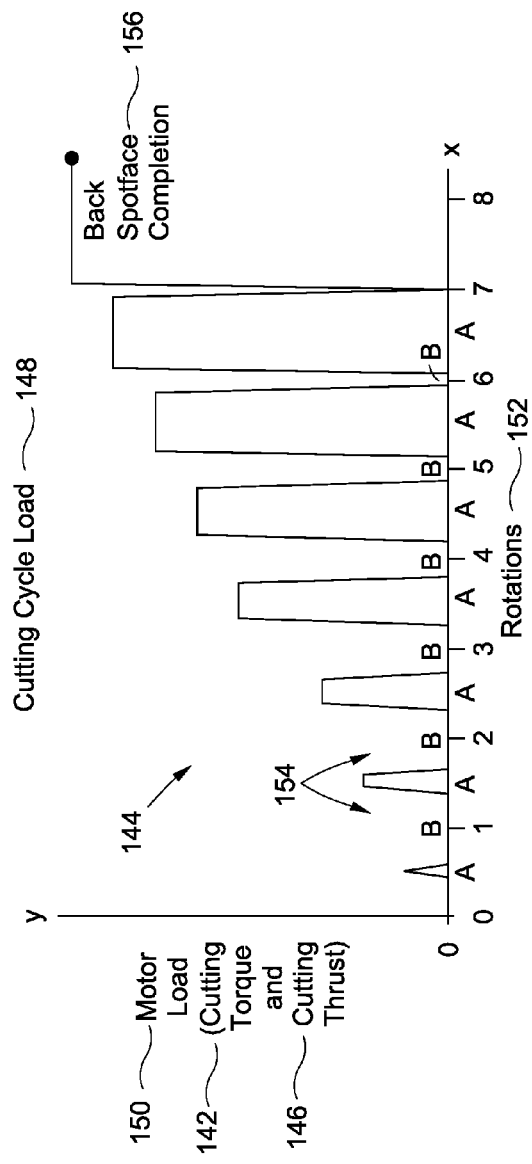
FIG. 8 is a graph showing a cutting cycle load during cutting of the back spotface cut of FIG. 7, and displaying motor load as a function of rotations of a through-hole cutter tool.
Figure 9:
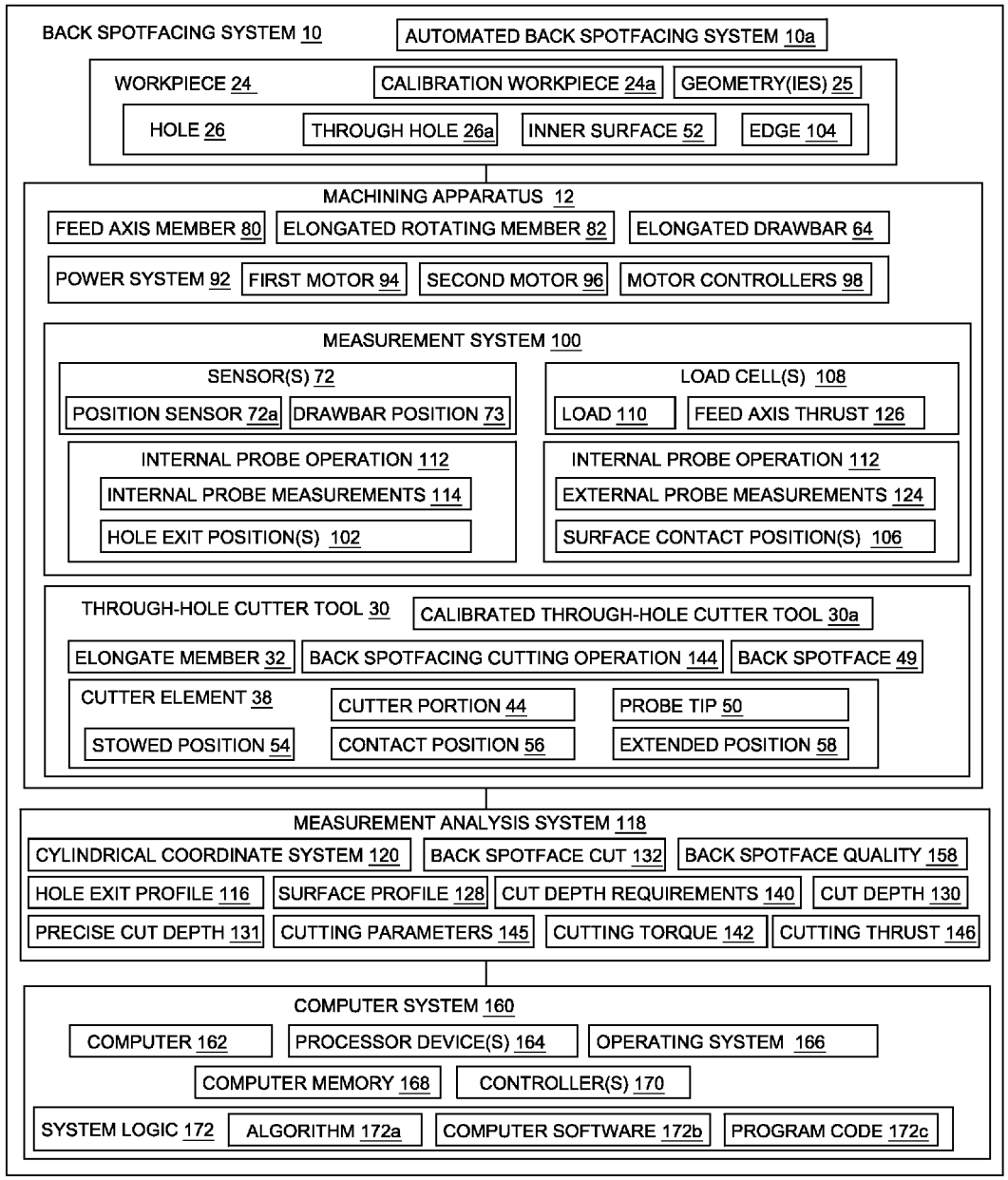
FIG. 9 is an illustration of a functional block diagram showing an exemplary embodiment of a back spotfacing system of the disclosure.

In another aspect of the back spotfacing system 10 (see FIGS. 1A-1B) and back spotfacing method 180 (see FIG. 10) of the disclosure, the back spotface cut 132 (see FIG. 7) may be characterized by a cutting torque 142 (see FIGS. 8, 9) applied to the back spotface cut 132 (see FIGS. 7, 9) during a back spotfacing cutting operation 144 (see FIGS. 8, 9), and a cutting thrust 146 (see FIGS. 8, 9) applied to the back spotface cut 132 (see FIGS. 7, 9) during the back spotfacing cutting operation 144 (see FIGS. 8, 9). The instantaneous cutting torque 142 (see FIGS. 8, 9) and cutting thrust 146 (see FIGS. 8, 9) directly relate to if the cutter portion 44 (see FIG. 2B) of the cutter element 38 (see FIG. 2B) is engaged with the material of the workpiece 24 (see FIGS. 1A, 5B), and if so, how much engaged.

For example, FIG. 7 is an illustration of a perspective view of a workpiece 24 with a back spotface cut 132 in which the cutting torque 142 (see FIGS. 8, 9) and the cutting thrust 146 (see FIGS. 8, 9) were analyzed. As shown in FIG. 7, a first back spotface cutting position (A) and a second back spotface cutting position (B) were analyzed with respect to a cutting cycle load 148 (see FIG. 8) during the back spotfacing cutting operation 144 (see FIGS. 8, 9).

FIG. 8 is a graph showing the cutting cycle load 148 during the back spotfacing cutting operation 144 of the back spotface cut 132 of FIG. 7. As shown in FIG. 8, the graph shows the cutting cycle load 148 during the back spotfacing cutting operation 144 for the first back spotface cutting position (A) and the second back spotface cutting position (B), and displays motor load 150 on the y-axis, as a function of rotations 152 on the x-axis of the through-hole cutter tool 30 (see FIGS. 1A-1B) making the back spotface cut 132. The motor load 150 (see FIG. 8) includes the cutting torque 142 (see FIG. 8) applied by the spindle motor 96a (see FIG. 1B) and the cutting thrust 146 (see FIG. 8) applied by the feed axis motor 94a (see FIG. 1B).

Due to the fact that the back spotface cut 132 (see FIG. 7) is not a continuous cut, a periodic relationship 154 (see FIG. 8) is seen for both the cutting torque 142 (see FIG. 8) and the cutting thrust 146 (see FIG. 8), and in turn, in the motor load 150 (see FIG. 8) seen by each of the spindle motor 96a (see FIG. 1B) and the feed axis motor 94a (see FIG. 1B). The cutting torque 142 (see FIGS. 8, 9) and the cutting thrust 146 (see FIGS. 8, 9) may be used to determine if the cutter portion 44 (see FIG. 2B) of the cutter element 38 (see FIG. 2B) is in contact with the surface 48 (see FIGS. 1A, 5B) of the workpiece 24 (see FIGS. 1A, 5B), if the cutter portion 44 (see FIG. 2B) of the cutter element 38 (see FIG. 2B) is cutting, and how much the cutter portion 44 (see FIG. 2B) of the cutter element 38 (see FIG. 2B) is cutting, in order to determine a back spotface completion 156 (see FIG. 8) or other aspects of back spotface quality 158 (see FIG. 9). The feed axis thrust 126 (see FIG. 9) is measured with the one or more load cells 108 (see FIG. 9). Examples of feed axis thrust 126 (see FIG. 9) measured with the one or more load cells 108 (see FIG. 9) included: 0 (zero) pounds of force or load when the cutter element 38 (see FIGS. 5A, 9) was not in contact with the surface 48 (see FIG. 5A) on the second side 28b (see FIG. 5A) of the workpiece 24 (see FIG. 5A) at the surface contact position 106 (see FIG. 5B); about 25 (twenty-five) pounds of force or load when the cutter element 38 (see FIGS. 5B, 9) contacted the surface 48 (see FIG. 5B) on the second side 28b (see FIG. 5B) of the workpiece 24 (see FIG. 5B) at the surface contact position 106 (see FIG. 5B); and greater than 25 (twenty-five) pounds of force or load, for example, about 40-50 (forty to fifty) pounds, or greater, of force or load, when the cutter element 38 (see FIG. 5B) was engaged in cutting the back spotface cut 132 (see FIGS. 6A-6B, 9) on the second side 28b (see FIG. 5B) of the workpiece 24 (see FIG. 5B).

In another embodiment there is provided an automated back spotfacing system 10a (see FIG. 9). FIG. 9 is an illustration of a functional block diagram showing an exemplary embodiment of a back spotfacing system 10, such as in the form of back spotfacing system 10a. By automating the cut depth 130 (see FIG. 9) and cutting parameters 145 (see FIG. 9), the back spotface quality 158 (see FIG. 9), the back spotface completion 156 (see FIG. 8) and control of the back spotface cut 132 (see FIG. 9) are preferably improved, as compared to known back spotfacing systems and methods.

As shown in FIG. 9, the automated back spotfacing system 10a comprises a machining apparatus 12. The machining apparatus 12 (see FIG. 9) comprises the through-hole cutter tool 30 (see FIG. 9) attached to the machining apparatus 12 (see FIG. 9). The through-hole cutter tool 30 (see FIG. 9) comprises the elongate member 32 (see FIG. 9) being movable to coaxially extend through the hole 26 (see FIG. 9), such as in the form of a through hole 26a, in the workpiece 24 (see FIG. 9) from the first side 28a (see FIG. 1A) of the workpiece 24 (see FIG. 9), the workpiece 24 (see FIG. 9) being coupled to the machining apparatus 12 (see FIG. 9). The through-hole cutter tool 30 (see FIG. 9) further comprises the cutter element 38 (see FIG. 9) pivotal between the stowed position 54 (see FIG. 9) on the elongate member 32 (see FIG. 9), the contact position 56 (see FIG. 9) with the inner surface 52 (see FIG. 9) of the hole 26 (see FIG. 9), and the extended position 58 (see FIG. 9) disengaged from the inner surface 52 (see FIG. 9) and extending radially from the elongate member 32 (see FIG. 9). The cutter element 38 (see FIG. 9) further comprises the cutter portion 44 (see FIG. 9) and the probe tip 50 (see FIG. 9).

The cutter element 38 (see FIG. 9) is configured for obtaining internal probe measurements 114 (see FIG. 9) when the cutter element 38 (see FIG. 9) disengages from the inner surface 52 (see FIG. 9) and is configured for obtaining external probe measurements 124 (see FIG. 9) when the cutter element 38 (see FIG. 9) is in the extended position 58 (see FIG. 9). The cutter element 38 (see FIG. 9) is further configured to cut and back spotface the surface 48 (see FIG. 9) on the second side 28b (see FIG. 1A) of the workpiece 24 (see FIG. 9) opposite the first side 28a (see FIG. 1A).

In one embodiment, the through-hole cutter tool 30 (see FIG. 9) may comprise a calibrated through-hole cutter tool 30a (see FIG. 9). The calibrated through-hole cutter tool 30a (see FIG. 9) may be calibrated using the internal probe measurements 114 (see FIG. 9) of the cutter element 38 (see FIG. 9) and the external probe measurements 124 (see FIG. 9) of the cutter element 38 (see FIG. 9) performed on the calibration workpiece 24a (see FIG. 9) that has been previously back spotfaced.

As shown in FIG. 9, the machining apparatus 12 of the automated back spotfacing system 10a further comprises the feed axis member 80 coupled to the elongate member 32 and configured to extend and retract the elongate member 32 through the hole 26 of the workpiece 24. The machining apparatus 12 (see FIG. 9) further comprises the elongated rotating member 82 (see FIG. 9) coupled to the elongate member 32 (see FIG. 9) and configured to rotate the elongate member 32 (see FIG. 9). The machining apparatus 12 (see FIG. 9) further comprises the elongated drawbar 64 (see FIG. 9) actuated by a drawbar actuator 68 (see FIG. 1A) and configured to actuate the cutter element 38 (see FIG. 9) to pivot from the stowed position 54 (see FIG. 9) to the extended position 58 (see FIG. 9).

The machining apparatus further comprises a power system 92 (see FIG. 9) coupled to the machining apparatus 12 (see FIG. 9) for powering the machining apparatus 12 (see FIG. 9) and the through-hole cutter tool 30 (see FIG. 9). As shown in FIG. 9, the power system 92 comprises the first motor 94, the second motor 96, and the motor controllers 98.

The machining apparatus 12 (see FIG. 9) further comprises the measurement system 100 (see FIG. 9) coupled to the machining apparatus 12 (see FIG. 9) for measuring the internal probe measurements 114 and measuring the external probe measurements 122 (see FIG. 9). As shown in FIG. 9, the measurement system 100 comprises one or more sensors 72, such as position sensors 72a, for measuring or sensing the drawbar position 73, and one or more load cells 108 for measuring load 110 and feed axis thrust 126.

As shown in FIG. 9, the automated back spotfacing system 10a may further comprise the measurement analysis system 118 for determining a hole exit profile 116 based on internal probe measurements 114 of the through-hole cutter tool 30, and a surface profile 128 based on external probe measurements 124 by the through-hole cutter tool 30.

As shown in FIG. 9, the measurement analysis system 118 preferably comprises a computer system 160 having a system logic 172. As further shown in FIG. 9, the computer system 160 comprises one or more computers 162, one or more processor devices 164, an operating system 166, a computer memory 168, and one or more controllers 170. As further shown in FIG. 9, the system logic 172 may comprise one or more of an algorithm 172a, computer software 172b, a program code 172c, or another suitable system logic 172.

The hole exit profile 116 (see FIG. 9) and the surface profile 128 (see FIG. 9) may be used to calculate the cut start position 136a (see FIGS. 6A-6B) and the cut end position 138b (see FIGS. 6A-6B) to obtain a precise cut depth 131 (see FIG. 9). The precise cut depth 131 (see FIG. 9) is preferably calculated using the hole exit profile 116 (see FIG. 9), the surface profile 128 (see FIG. 9), and the system logic 172 (see FIG. 9) prior to the cutter element 38 (see FIG. 9) cutting and back spotfacing the surface 48 (see FIG. 9) to form the back spotface 49 (see FIG. 9). The precise cut depth 131 (see FIG. 9) preferably meets the cut depth requirements 140 (see FIG. 9), such as fatigue and strength tolerances of the precise cut depth 131 (see FIG. 9).

The measurement analysis system 118 (see FIG. 9) may use the cutting torque 142 (see FIG. 9) and the cutting thrust 146 (see FIG. 9) applied to the back spotface cut 132 (see FIG. 9) during the back spotfacing cutting operation 144 (see FIG. 9), to determine if the cutter element 38 (see FIG. 9) is in contact with the surface 48 (see FIG. 9) of the workpiece 24 (see FIG. 9), if the cutter element 38 (see FIG. 9) is cutting, and how much the cutter element 38 (see FIG.

9) is cutting, in order to further determine a back spotface completion 156 (see FIG. 8) and a back spotface quality 158 (see FIG. 9).

Figure 10:
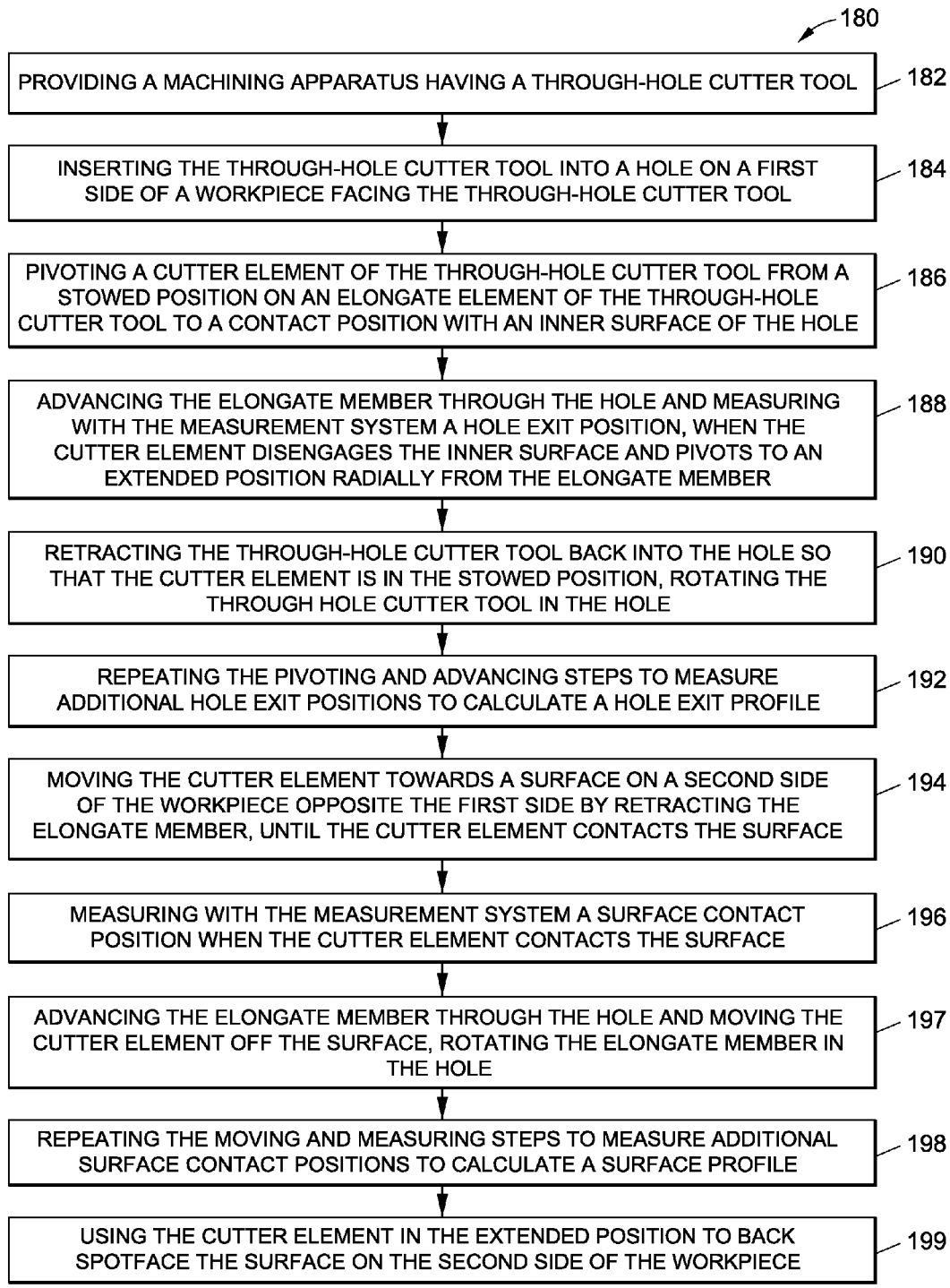
FIG. 10 is an illustration of a block flow diagram showing an exemplary embodiment of a back spotfacing method of the disclosure.

Referring to FIG. 10, in another embodiment, there is provided a back spotfacing method 180. FIG. 10 is an illustration of a block flow diagram showing an exemplary embodiment of the back spotfacing method 180 of the disclosure.

As shown in FIG. 10, the method 180 comprises step 182 of providing a machining apparatus 12 (see FIG. 1A) having a through-hole cutter tool 30 (see FIG. 1A) attached to the machining apparatus 12 (see FIG. 1A), and further having a power system 92 (see FIG. 1A) and a measurement system 100 (see FIG. 1A). The machining apparatus 12 (see FIG. 1A) is discussed in detail above. The machining apparatus 12 (see FIG. 1A) may further comprise the measurement analysis system 118 (see FIG. 9).

As shown in FIG. 10, the method 180 further comprises step 184 of inserting the through-hole cutter tool 30 (see FIG. 1A) into a hole 26 (see FIG. 1A) on a first side 28a (see FIG. 1A) of a workpiece 24 (see FIG. 1A) facing the through-hole cutter tool 30 (see FIG. 1A). As shown in FIG. 10, the method 180 further comprises step 186 of pivoting a cutter element 38 (see FIG. 1A) of the through-hole cutter tool 30 (see FIG. 1A) from a stowed position 54 (see FIG. 4A) on an elongate member 32 (see FIG. 4A) of the through-hole cutter tool 30 (see FIG. 1A) to a contact position 56 (see FIG. 4B) with an inner surface 52 (see FIG. 4B) of the hole 26 (see FIG. 4B).

As shown in FIG. 10, the method 180 further comprises step 188 of advancing the elongate member 32 (see FIG. 1A) through the hole 26 (see FIG. 1A) and measuring with the measurement system 100 (see FIG. 1A) a hole exit position 102 (see FIG. 9), when the cutter element 38 (see FIG. 1A) disengages the inner surface 52 (see FIG. 4B) and pivots to an extended position 58 (see FIG. 4C) extending radially from the elongate member 32 (see FIG. 4C). The step 188 of measuring the hole exit position 102 (see FIG. 9) comprises measuring with one or more position sensors 72a (see FIG. 1A) each hole exit position 102 (see FIG. 9), when the cutter element 38 (see FIG. 5C) disengages from the inner surface 52 (see FIG. 4B) of the hole 26 (see FIG. 4B) and pivots to the extended position 58 (see FIG. 4C).

As shown in FIG. 10, the method 180 further comprises step 190 of retracting the through hole cutter tool 30 (see FIG. 4A) back into the hole 26 (see FIG. 4A) so that the cutter element 38 (see FIG. 4A) is in the stowed position 54 (see FIG. 4A), rotating the through hole cutter tool 30 (see FIG. 4A) in the hole 26 (see FIG. 4A). As shown in FIG. 10, the method 180 further comprises step 192 of repeating the pivoting step 186 and repeating the advancing step 188 to measure additional hole exit positions 102 (see FIG. 9) to calculate a hole exit profile 116 (see FIG. 9).

As shown in FIG. 10, the method 180 further comprises step 194 of moving the cutter element 38 (see FIG. 5B) towards a surface 48 (see FIG. 5B) on a second side 28b (see FIG. 5B) of the workpiece 24 (see FIG. 5B) opposite the first side 28a (see FIG. 1A) by retracting the elongate member 32 (see FIG. 5B), until the cutter element 38 (see FIG. 5B) contacts the surface 48 (see FIG. 5B). As shown in FIG. 10, the method 180 further comprises step 196 of measuring with the measurement system 100 (see FIG. 9) a surface contact position 106 (see FIG. 9) when the cutter element 38 (see FIG. 5B) contacts the surface 48 (see FIG. 5B). The step 196 of measuring the surface contact position 106 (see FIG. 5B) comprises measuring with one or more load cells 108 (see FIG. 1A) each surface contact position 106 (see FIG. 9) of the cutter element 38 (see FIG. 5B) on the surface 48 (see FIG. 5B), by measuring a load 110 (see FIG. 9) applied to the elongate member 32 (see FIG. 5B), when the cutter element 38 (see FIG. 5B) contacts the surface 48 (see FIG. 5B).

As shown in FIG. 10, the method 180 further comprises step 197 of advancing the elongate member 32 (see FIG. 5B) through the hole 26 (see FIG. 5B) and moving the cutter element 38 (see FIG. 5B) off the surface 48 (see FIG. 5B), rotating the elongate member 32 (see FIG. 5B) in the hole 26 (see FIG. 5B). As shown in FIG. 10, the method 180 further comprises step 198 of repeating the moving step 194 and repeating the measuring step 196 to measure additional surface contact positions 106 (see FIG. 5B) to calculate a surface profile 128 (see FIG. 9). As shown in FIG. 10, the method 180 further comprises step 199 of using the cutter element 38 (see FIG. 1A) in the extended position 58 (see FIG. 4C, 5A) to back spotface the surface 48 (see FIG. 1A) on the second side 28b (see FIG. 1A) of the workpiece 24 (see FIG. 1A).

The method 180 may further comprise before the step 184 of inserting the through-hole cutter tool 30 (see FIG. 1A) into the hole 26 (see FIG. 1A), the step of calibrating the through-hole cutter tool 30 (see FIG. 1A) calibrated with internal probe measurements 114 (see FIG. 9) of the cutter element 38 (see FIG. 1A) and external probe measurements 124 (see FIG. 9) of the cutter element 38 (see FIG. 1A) performed on a calibration workpiece 24a (see FIG. 9) that has been previously back spotfaced, to obtain a calibrated through-hole cutter tool 30a (see FIG. 9).

The method 180 may further comprise after calibration and before step 199 of using the cutter element 38 (see FIG. 9) to back spotface the surface 48 (see FIG. 9), calculating a precise cut depth 131 (see FIG. 9) using the hole exit profile 116 (see FIG. 9) and the surface profile 128 (see FIG. 9).

The method 180 may further comprise the step of determining a back spotface completion 156 (see FIG. 9) and a back spotface quality 158 (see FIG. 9) by using a cutting torque 142 (see FIG. 9) and a cutting thrust 146 (see FIG. 9) applied to a back spotface cut 132 (see FIG. 9) during a back spotfacing cutting operation 144 (see FIG. 9) to determine if the cutter element 38 (see FIG. 9) is in contact with the surface 48 (see FIG. 9) of the workpiece 24 (see FIG. 9), if the cutter element 38 (see FIG. 9) is cutting, and how much the cutter element 38 (see FIG. 9) is cutting.

Figure 11:
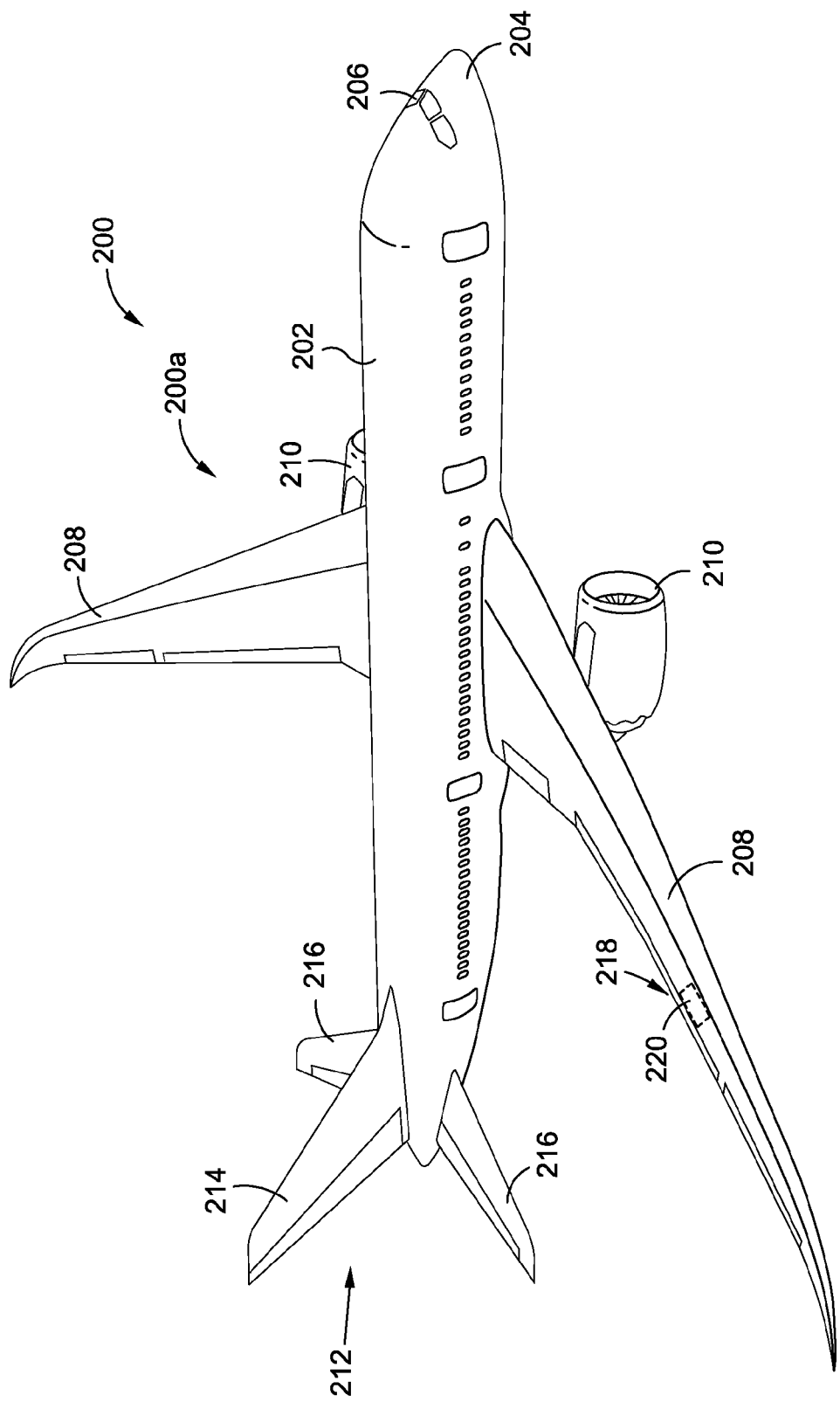
FIG. 11 is an illustration of a perspective view of an aircraft that may incorporate one or more structures that may be machined and back spotfaced using embodiments of a back spotfacing system and method of the disclosure.

FIG. 11 is an illustration of a perspective view of an aircraft that may incorporate one or more structures that may be machined and back spotfaced using embodiments of a back spotfacing system and method of the disclosure.

FIG. 11 is an illustration of a perspective view of an air vehicle 200, such as an aircraft 200a, that includes one or more structures 218, such as a part 220, that may be machined and back spotfaced using embodiments of the back spotfacing system 10 (see FIGS. 1A-1B) and the back spotfacing method 180 (see FIG. 10) of the disclosure. As shown in FIG. 11, the aircraft 200a comprises such components as a fuselage 202, a nose 204, a flight deck 206, wings 208, one or more propulsion units 210, and a tail 212 comprising a vertical tail portion 214 and horizontal tail portions 216.

Although the aircraft 200a shown in FIG. 11 is generally representative of a commercial passenger aircraft having one or more structures 218, the teachings of the disclosed embodiments may be applied to other passenger aircraft. For example, the teachings of the disclosed embodiments may be applied to cargo aircraft, military aircraft, rotorcraft, and other types of aircraft or aerial vehicles, as well as aerospace vehicles, satellites, space launch vehicles, rockets, and other aerospace vehicles.

Figure 12:
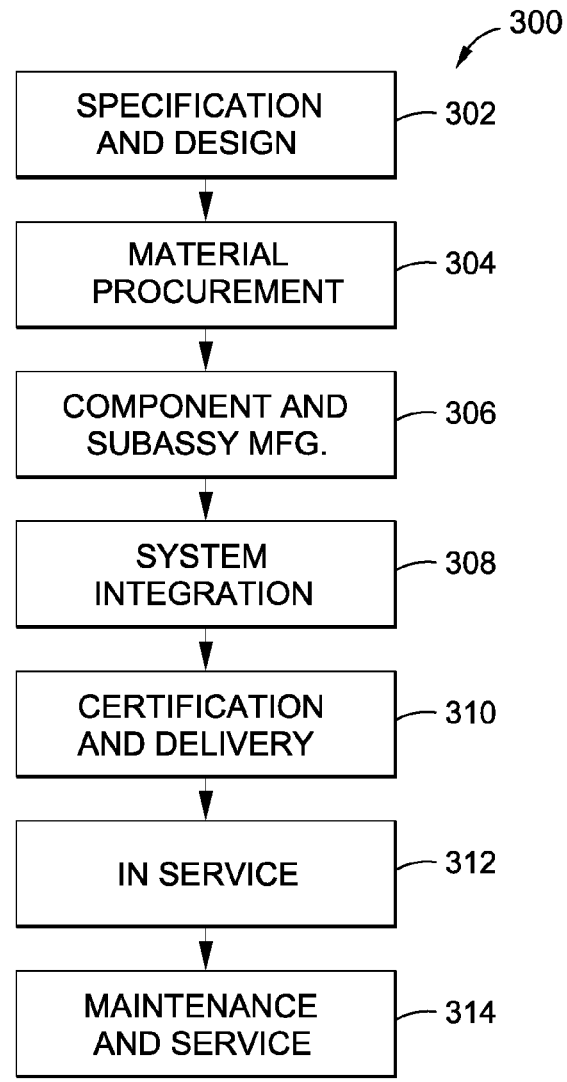
FIG. 12 is an illustration of a flow diagram of an aircraft manufacturing and service method; and, FIG. 13 is an illustration of a block diagram of an aircraft.
Figure 13:
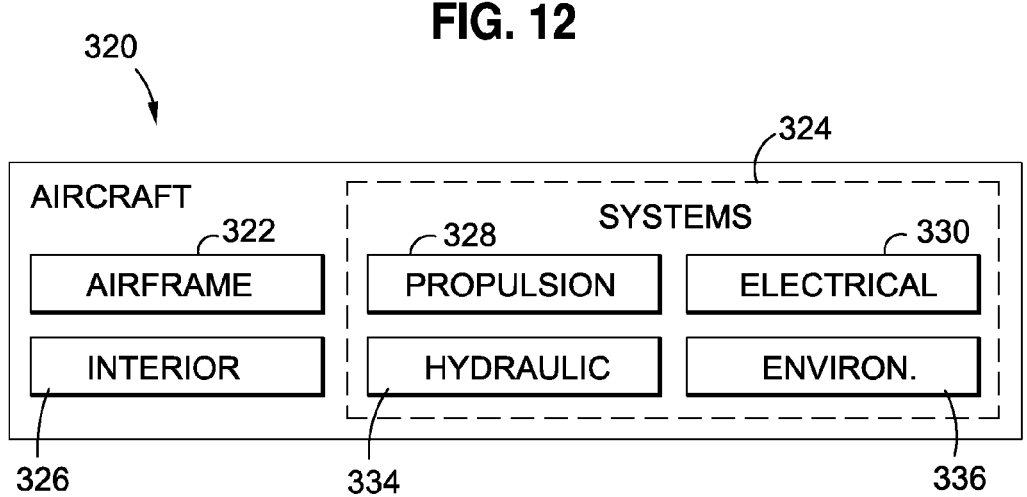

FIG. 12 is an illustration of a flow diagram of an aircraft manufacturing and service method 300. FIG. 13 is an illustration of a block diagram of an aircraft 320. Referring to FIGS. 12-13, embodiments of the disclosure may be described in the context of the aircraft manufacturing and service method 300 as shown in FIG. 12, and the aircraft 320 as shown in FIG. 13.

During pre-production, exemplary aircraft manufacturing and service method 300 may include specification and design 302 of the aircraft 320 and material procurement 304. During manufacturing, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 13, the aircraft 320 produced by the exemplary aircraft manufacturing and service method 300 may include an airframe 322 with a plurality of systems 324 and an interior 326. Examples of the plurality of systems 324 may include one or more of a propulsion system 328, an electrical system 330, a hydraulic system 332, and an environmental system 336. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to maintenance and service 314.

Disclosed embodiments of the back spot facing system 10 (see FIGS. 1A-1B, 9) and the back spot facing method 180 (see FIG. 10) provide a through-hole cutter tool 30 (see FIG. 1A) for machining or cutting a back spotface 49 (see FIG. 9) on a second side 28b (see FIG. 1A) or backside of a workpiece 24 (see FIG. 1A), where the through-hole cutter tool 30 (see FIG. 1A) is also used to measure geometries 25 (see FIG. 9) of the workpiece 24 (see FIG. 1A), so that a precise cut depth 131 (see FIG. 9) may be calculated based on cut depth requirements 140 (see FIG. 9). The use of the through-hole cutter tool 30 (see FIG. 1A) to measure geometries 25 (see FIG. 9) of the workpiece 24 (see FIG. 1A) allows the back spot facing system 10 (see FIGS. 1A-1B, 9) and the back spot facing method 180 (see FIG. 10) to calculate and execute the back spotfacing cutting operation 144 (see FIG. 9). Moreover, by automating the precise cut depth 131 (see FIG. 9) and cutting parameters 145 (see FIG. 9), the back spotface quality 158 (see FIG. 9), the back spotface completion 156 (see FIG. 8) and control of the back spotface cut 132 (see FIG. 9) are preferably improved, as compared to known back spotfacing systems and methods. In addition, the precise cut depth 131 (see FIG. 9) of the back spotface cut 132 (see FIG. 9) meets the cut depth requirements 140 (see FIG. 9).

Further, disclosed embodiments of the back spot facing system 10 (see FIGS. 1A-1B, 9) and the back spot facing method 180 (see FIG. 10) provide an automated back spot facing system 10 (see FIGS. 1A-1B, 9) and back spot facing method 180 (see FIG. 10) that rotates or spins the through-hole cutter tool 30 (see FIG. 1A), as the through-hole cutter tool 30 (see FIG. 1A) is retracting and extending through the hole 26 (see FIG. 1A). The through-hole cutter tool 30 (see FIG. 1A) can extend or open, and retract or close, the cutter element 38 (see FIG. 1A) that is perpendicular to the axis of the hole 26 (see FIG. 1A), while measuring one or more hole exit positions 102 (see FIG. 9) and measuring one or more surface contact positions 106 (see FIG. 9). The cutter element 38 (see FIG. 1A) pivots between the stowed position 54 (see FIG. 4A) on the elongate member 32 (see FIG. 4A), the contact position 56 (see FIG. 4B) with the inner surface 52 (see FIG. 4B) of the hole 26 (see FIG. 4B), and the extended position 58 (see FIGS. 4C, 5A-5B) where the cutter element 38 (see FIG. 1A) is disengaged from the inner surface 52 (see FIG. 4B) of the hole 26 (see FIG. 4B), and extends radially from the elongate member 32 (see FIGS. 4C, 5A-5B).

The through-hole cutter tool 30 (see FIG. 1A) via the cutter element 38 (see FIG. 1A) performs the internal probe operation 112 (see FIG. 9) to obtain or detect internal probe measurements 114 (see FIG. 9), such as the one or more hole exit positions 102 (see FIG. 9), when the cutter element 38 (see FIG. 1A) disengages from the inner surface 52 (see FIG. 4B) of the hole 26 (see FIG. 4B) and pivots to the extended position 58 (see FIG. 4C). The through-hole cutter tool 30 (see FIG. 1A) via the cutter element 38 (see FIG. 1A) performs the external probe operation 122 (see FIG. 1A) to obtain external probe measurements 124 (see FIG. 9), such as the one or more surface contact positions 106 (see FIG. 9), when the elongate member 32 (see FIG. 1A) is retracted and the cutter element 38 (see FIG. 5B) contacts the surface 48 (see FIG. 5B). The internal probe measurements 114 (see FIG. 9) may be used to determine the hole exit profile 116 (see FIG. 9), and the external probe measurements 124 (see FIG. 9) may be used to determine the surface profile 128 (see FIG. 9).

The hole exit profile 116 (see FIG. 9) and the surface profile 128 (see FIG. 9) may be used to calculate the cut start position 136a (see FIGS. 6A-6B) and the cut end position 138b (see FIGS. 6A-6B) to obtain a precise cut depth 131 (see FIG. 9). In addition, the internal probe operation 112 (see FIG. 9) and the external probe operation 122 (see FIG. 9) may be used to calibrate the through-hole cutter tool 30 (see FIG. 9) to obtain a calibrated through-hole cutter tool 30a (see FIG. 9). The calibration of the through-hole cutter tool 30 (see FIG. 9) involves using a calibration workpiece (24a) that has been previously back spotfaced.

In addition, disclosed embodiments of the back spot facing system 10 (see FIGS. 1A-1B, 9) and the back spot facing method 180 (see FIG. 10) are simple to use, safe, cost effective, reliable and repeatable, determine a precise cut depth 131 (see FIG. 9), and provide advantages over known back spotfacing systems and methods. The back spot facing system 10 (see FIGS. 1A-1B, 9) and the back spot facing method 180 (see FIG. 10) allow for the back spotfacing cutting operation 144 (see FIG. 9) to be performed from one side of the workpiece 24 (see FIG. 1A) or part 220 (see FIG. 11) without requiring one or more additional workers to monitor the back spotfacing cutting operation 144 (see FIG. 9) and the back spot facing method 180 (see FIG. 10). This may reduce labor costs, which may, in turn, reduce manufacturing costs. Further, this may improve ergonomics and safety, and may eliminate the need to use large tooling in order to process back spotfaces 49 (see FIG. 9).

Moreover, disclosed embodiments of the back spot facing system 10 (see FIGS. 1A-1B, 9) and the back spot facing method 180 (see FIG. 10) provide the capability to back spotface aircraft parts, such as engine fittings, and to assemble aircraft parts, such as wings 208 (see FIG. 11) during the back spotfacing cutting operation 144 (see FIG. 9). This may result in a reduction in the overall process or manufacturing time, which in turn, may result in decreased manufacturing costs. Further, the back spot facing system 10 (see FIGS. 1A-1B, 9) and the back spot facing method 180 (see FIG. 10) provide the capability of back spotfacing multiple sizes of holes and can work with multiple sizes of workpieces 24 (see FIG. 1A) and parts 220 (see FIG. 11).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A back spotfacing system comprising:
    a machining apparatus having a through-hole cutter tool attached to the machining apparatus, the through-hole cutter tool comprising:
        an elongate member being movable to coaxially extend through a hole in a workpiece from a first side of the workpiece, the workpiece being coupled to the machining apparatus;
        a cutter element pivotal between a stowed position on the elongate member, a contact position with an inner surface of the hole, and an extended position disengaged from the inner surface and extending radially from the elongate member, in which in the extended position, the cutter element extends to machine and back spotface a surface on a second side of the workpiece opposite the first side;
    a power system coupled to the machining apparatus for powering the machining apparatus and the through-hole cutter tool; and,
    a measurement system coupled to the machining apparatus for measuring one or more hole exit positions of the cutter element and one or more surface contact positions of the cutter element on the surface of the second side of the workpiece.

2. The system of claim 1 wherein the machining apparatus comprises a feed axis member coupled to the elongate member and configured to extend and retract the elongate member through the hole of the workpiece, and further comprises an elongated rotating member coupled to the elongate member and configured to rotate the elongate member.

3. The system of claim 2 wherein the power system comprises a first motor configured for driving the feed axis member, a second motor configured for rotating the elongated rotating member, and two or more motor controllers for controlling the first motor and the second motor.

4. The system of claim 1 wherein the machining apparatus comprises an elongated drawbar actuated by a drawbar actuator and configured to actuate the cutter element to pivot from the stowed position to the extended position.

5. The system of claim 1 wherein the through-hole cutter tool is a calibrated through-hole cutter tool calibrated with internal probe measurements of the cutter element and external probe measurements of the cutter element performed on a calibration workpiece that has been previously back spotfaced.

6. The system of claim 1 wherein the cutter element comprises a cutter portion configured to machine and back spotface the surface on the second side of the workpiece, and further comprises a probe tip configured to contact the inner surface of the hole.

7. The system of claim 1 wherein the measurement system comprises one or more sensors for measuring each hole exit position, when the cutter element disengages from the inner surface of the hole and pivots to the extended position.

8. The system of claim 1 wherein the measurement system comprises one or more load cells for measuring each surface contact position of the cutter element on the surface, by measuring a load applied to the elongate member, when the cutter element is in the extended position and the elongate member is retracted to move the cutter element towards the surface to contact the surface.

9. The system of claim 1 further comprising a measurement analysis system for determining a hole exit profile based on internal probe measurements of the through-hole cutter tool, and a surface profile based on external probe measurements by the through-hole cutter tool, the measurement analysis system comprising a computer system having a system logic.

10. The system of claim 9 wherein the measurement analysis system uses a cutting torque and a cutting thrust applied to a back spotface cut during a back spotfacing cutting operation, to determine if the cutter element is in contact with the surface of the workpiece, if the cutter element is cutting, and how much the cutter element is cutting, in order to further determine a back spotface completion and a back spotface quality.

11. An automated back spotfacing system comprising:
    a machining apparatus comprising:
        a through-hole cutter tool attached to the machining apparatus, the through-hole cutter tool comprising:
            an elongate member being movable to coaxially extend through a hole in a workpiece from a first side of the workpiece, the workpiece being coupled to the machining apparatus;
            a cutter element pivotal between a stowed position on the elongate member, a contact position with an inner surface of the hole, and an extended position disengaged from the inner surface and extending radially from the elongate member, the cutter element configured for obtaining internal probe measurements when the cutter element disengages from the inner surface and configured for obtaining external probe measurements when the cutter element is in the extended position, and configured to cut and back spotface a surface on a second side of the workpiece opposite the first side;

a feed axis member coupled to the elongate member and configured to extend and retract the elongate member through the hole of the workpiece;

an elongated rotating member coupled to the elongate member and configured to rotate the elongate member;

an elongated drawbar actuated by a drawbar actuator and configured to actuate the cutter element to pivot from the stowed position to the extended position;

a power system coupled to the machining apparatus for powering the machining apparatus and the through-hole cutter tool; and, a measurement system coupled to the machining apparatus for measuring the internal probe measurements and measuring the external probe measurements; and, a measurement analysis system for determining a hole exit profile based on the internal probe measurements, and a surface profile based on the external probe measurements, the measurement analysis system comprising a computer system having a system logic.

12. The system of claim 11 wherein the through-hole cutter tool is a calibrated through-hole cutter tool calibrated with the internal probe measurements and the external probe measurements performed on a calibration workpiece that has been previously back spotfaced.

13. The system of claim 11 wherein a precise cut depth is calculated using the hole exit profile, the surface profile, and the system logic prior to the cutter element cutting and back spotfacing the surface.

14. The system of claim 11 wherein the measurement analysis system uses a cutting torque and a cutting thrust applied to a back spotface cut during a back spotfacing cutting operation, to determine if the cutter element is in contact with the surface of the workpiece, if the cutter element is cutting, and how much the cutter element is cutting, in order to further determine a back spotface completion and a back spotface quality.

* * * * *